(12) United States Patent
Carrette

(10) Patent No.: US 8,656,857 B2
(45) Date of Patent: Feb. 25, 2014

(54) MARKER INSTALLATION APPARATUS

(75) Inventor: Paul Michael Carrette, Garretson, SD (US)

(73) Assignee: Flagshooter Holdings, LLC, Garretson, SD (US)

(*) Notice: Subject to any disclaimer, the term of this patent is extended or adjusted under 35 U.S.C. 154(b) by 204 days.

(21) Appl. No.: 13/092,804

(22) Filed: Apr. 22, 2011

(65) Prior Publication Data

US 2011/0210154 A1  Sep. 1, 2011

Related U.S. Application Data

(63) Continuation-in-part of application No. 12/435,156, filed on May 4, 2009, now Pat. No. 7,992,754, and a continuation-in-part of application No. 12/435,167, filed on May 4, 2009, now Pat. No. 8,065,856.

(60) Provisional application No. 61/354,048, filed on Jun. 11, 2010, provisional application No. 61/326,905, filed on Apr. 22, 2010.

(51) Int. Cl.
*G01D 21/00* (2006.01)

(52) U.S. Cl.
USPC .......................................................... 116/209

(58) Field of Classification Search
USPC ............. 116/209; 40/606.01, 607.01, 607.05, 40/607.06
See application file for complete search history.

(56) References Cited

U.S. PATENT DOCUMENTS

| | | | |
|---|---|---|---|
| 2,426,443 A * | 8/1947 | Fetterman | .......................... 47/47 |
| 2,638,867 A | 5/1953 | Felton | |
| 3,158,132 A | 11/1964 | Guthrie | |
| 3,182,936 A | 5/1965 | Murdock | |
| 3,309,048 A | 3/1967 | Rousselet | |
| 3,684,224 A | 8/1972 | Kwako | |
| 4,343,449 A | 8/1982 | Osthus | |
| 4,520,985 A | 6/1985 | Blumenthal | |
| 4,627,563 A | 12/1986 | Meyer | |
| 4,706,864 A | 11/1987 | Jacobsen et al. | |
| 4,826,066 A | 5/1989 | Koester | |
| D304,039 S | 10/1989 | Henderson | |
| 5,025,969 A * | 6/1991 | Koester et al. | ................ 227/120 |
| 5,238,322 A | 8/1993 | Stirtz | |
| 5,671,814 A | 9/1997 | Smith | |
| 5,918,565 A | 7/1999 | Casas | |
| 5,988,296 A | 11/1999 | Zachman | |
| 6,015,122 A | 1/2000 | Qui | |
| 6,053,260 A | 4/2000 | Boon | |
| 6,085,452 A | 7/2000 | Davis | |
| 6,435,129 B1 | 8/2002 | McDonald | |

(Continued)

*Primary Examiner* — Daniel S Larkin
*Assistant Examiner* — Irving A Campbell
(74) *Attorney, Agent, or Firm* — Etherton Law Group, LLC

(57) ABSTRACT

A marker installation system is disclosed for inserting a marker of the type having shaft with a bottom end for inserting into a ground surface and an engagement portion of the shaft separated from the bottom end by an insertion portion of the shaft. The apparatus includes a magazine assembly defining a magazine space configured to receive at least one marker. The magazine space has a push position in the magazine space for receiving the at least one marker. The apparatus further comprises a push assembly mounted on the magazine assembly. The push assembly is configured to engage the engagement portion of the shaft of the marker located in the push position and push the marker from the magazine assembly when the push assembly is actuated. A plurality of the markers are bonded together such that each of the markers can be removed from the rest of the plurality when it is desired to insert a marker into the ground.

22 Claims, 47 Drawing Sheets

(56) References Cited

U.S. PATENT DOCUMENTS

| | | |
|---|---|---|
| 6,450,388 B1 | 9/2002 | Denton |
| 6,571,885 B2 | 6/2003 | Lee |
| 6,802,278 B2 * | 10/2004 | McDonald et al. ........... 116/211 |
| D503,842 S | 4/2005 | Barnes |
| 6,938,370 B2 | 9/2005 | Johns |
| 7,372,247 B1 | 5/2008 | Giusti |
| 8,065,856 B2 * | 11/2011 | Carrette ........................ 53/120 |
| 2003/0196585 A1 | 10/2003 | McDonald |

\* cited by examiner

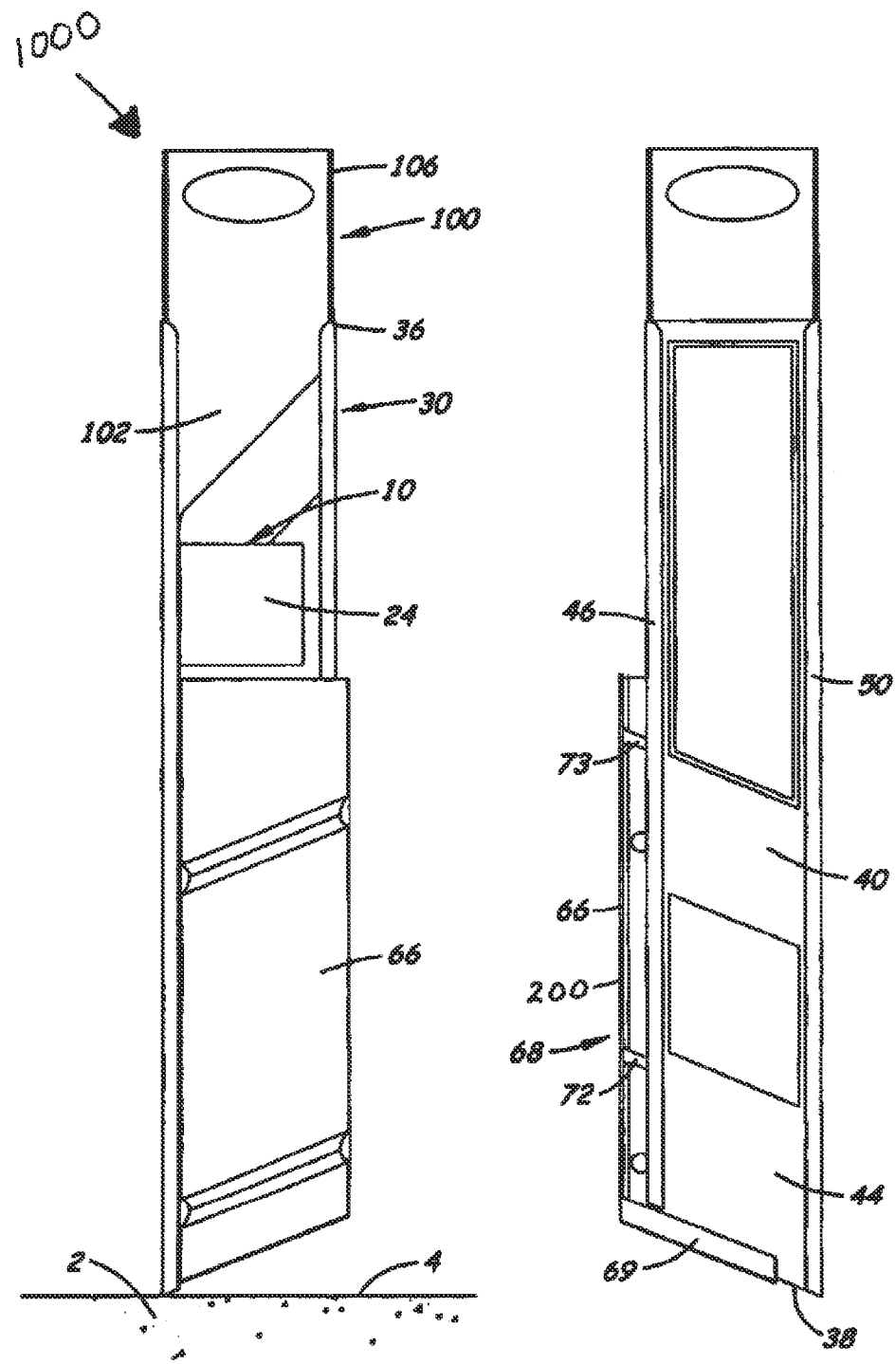

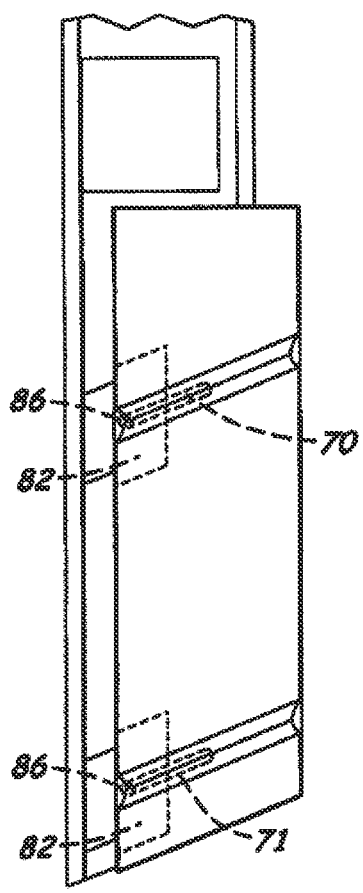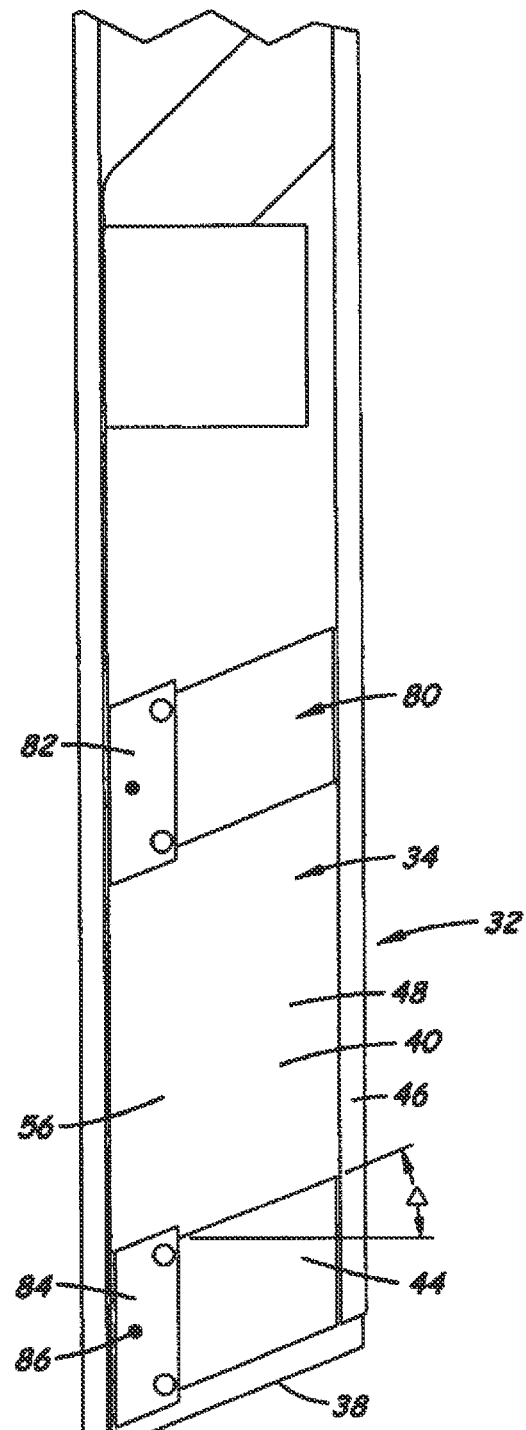
Fig. 8
Fig. 9

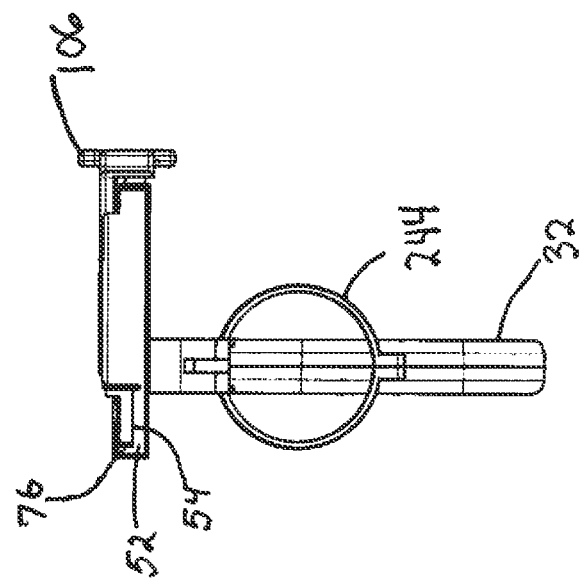

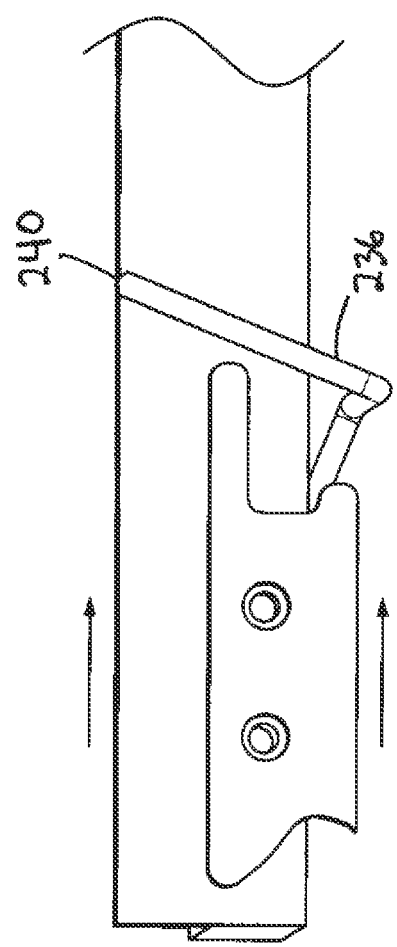

MARKER INSTALLATION APPARATUS

CROSS-REFERENCE TO RELATED APPLICATIONS

The present application claims the priority of U.S. application Ser. No. 12/435,156 entitled "MARKER SYSTEM WITH MARKER AND INSTALLATION APPARATUS" which was filed May, 4, 2009; U.S. application Ser. No. 12/435,167 entitled "MARKER SYSTEM WITH MARKER AND INSTALLATION APPARATUS" which was filed May, 4, 2009; U.S. Provisional Application Ser. No. 61/326,905 entitled "MARKER INSTALLATION APPARATUS AND METHOD" which was filed Apr. 22, 2010; and U.S. Provisional Application Ser. No. 61/354,048 entitled "MARKER INSTALLATION SYSTEM, APPARATUS AND METHOD" which was filed Jun. 11, 2010, all of which are hereby incorporated by reference.

TECHNICAL FIELD

The subject disclosure relates to ground marking systems, and more particularly to a new marker for marking a ground surface to, for example, indicate the presence of buried utilities, boundaries, events, advertising, etc. in a highly efficient and convenient manner.

BACKGROUND

By way of background concerning some conventional systems, it can be desirable to mark the ground surface to indicate, for example, the presence of underground utilities, the location of lot boundaries, and the like. This marking is often accomplished by the insertion of markers into the ground that extend upward from the ground surface and may include a flag at the top end. Numerous markers may be placed at spaced locations along the path of the buried utility line, and this may be true of each buried utility service (such as electric, gas, telephone, water, sewer).

Generally, markers are inserted into the ground surface by hand. For example, one method of inserting a single marker to indicate the presence of buried electric cable involves the steps of: configuring detection equipment to detect the buried cable; detecting the buried cable with a detector; storing the detector (e.g., in a holster, on the ground surface); selecting a can of spray paint containing a paint colored to correspond to the type of utility being marked (e.g., burried electric cable); spraying paint from the selected can onto the ground surface above the buried cable's location; storing the can of spray paint; selecting a marker with characteristics that correspond to the type of utility (e.g., a flag with a visual indicator printed or colored to indicate buried electric cable); and inserting the flag into the ground surface proximate to the paint and above the buried cable's location. This method is repeated until a desired amount (e.g., length) of the buried cable has been marked.

However, the installation of the markers carries with it a variety of deficiencies. One such deficiency conventionally associated with the installation of markers to demarcate the location of a buried object is that the process can be laborious, due to the numbers of markers that need to be placed as well as the manner in which the markers are inserted. The markers may be inserted by hand into the ground with no mechanical assistance, but this requires repeatedly bending down to engage and insert the marker into the ground surface. This repeated bending over can be physically taxing on the person performing the marking operation.

A number of devices have been proposed to facilitate the placement of markers. Another deficiency commonly associated with the installation of markers is that while these devices may work in some instances, some appear to actually make the insertion action more difficult by increasing the cross sectional profile of the portion of the marker that is being inserted into the ground (and thereby causing more resistance due to the larger profile), and/or requiring that a portion of apparatus be inserted in the ground as well. This approach can make it difficult if not impossible to insert markers into ground that is highly compacted, stony, or is even slightly frozen, to name a few of the factors making the insertion more difficult.

A further deficiency commonly associated with the installation of markers is that many of the known devices attempt to hold the marker by utilizing friction between the device and the marker to permit the device to move the marker. This approach tends to be less effective when, for example, using markers presenting a relatively large cross sectional profile and when the ground is compacted, stony, frozen, etc.

An even further deficiency commonly associated with the installation of marks is that some of the devices in the prior art must be loaded with a marker each time that a marker is to be installed, which requires continual reloading of the device. Also, some devices require a relatively strong and rigid marker in order to push the marker into the ground, and this may require markers with thicker cross sectional sizes in order to provide the necessary rigidity.

The above-described deficiencies of today's markers and marker systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various embodiments of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

A new marker installation system for use with a marker and a marker insertion apparatus in marking a ground surface is disclose. The marker comprises a shaft having a bottom end and a top end. The shaft includes an insertion portion for insertion into the ground. The insertion portion is located at the bottom end of the shaft. A mast portion extends above the ground surface when the insertion portion is at least partially inserted into the ground. An engagement portion is located between the insertion portion and the mast portion with the insertion portion located between the engagement portion and the bottom end. The engagement portion is configured to be engaged and pushed by the marker insertion apparatus to cause insertion of the bottom end of the shaft into the ground. The marker insertion apparatus includes a magazine assembly defining a magazine space for receiving at least one marker. The magazine space has a push position in the magazine space for receiving the at least one marker. A push assembly is mounted on the magazine assembly. The push assembly is configured to engage the engagement portion of the shaft of the marker located in the push position, and push the marker from the magazine assembly when the push assembly is actuated.

According to an embodiment, multiple markers can be loaded into a magazine assembly of the marker installation apparatus, enabling the storage and use of multiple markers within a single marker installation apparatus. A biasing assembly of the marker installation apparatus can be used to bias the multiple markers toward the push position, such that a marker is advanced to the push position after the previous marker is inserted into the ground surface.

According to an embodiment, multiple markers can be linked or collated together to facilitate handling and insertion of the collated markers into the magazine assembly.

According to an embodiment, a paint stick of the marker installation apparatus can be removed from the marker installation apparatus and used independently of the marker insertion components if desired.

According to an embodiment, no maximum length is imposed upon flags that are to be inserted in the marker installation apparatus for installation into a ground surface (e.g., small, medium and tall flags can be installed in an embodiment without requiring modifications to the embodiment).

According to an embodiment, a magazine assembly may be positioned relative to a paint stick such that a plane of a handle of the paint stick is substantially perpendicular to the magazine assembly such that wind encountering the magazine assembly would causes force in a substantially forward and backward direction on the handle, which is relatively easy to control in comparison to a force applied to the handle in a side to side direction.

According to an embodiment, the length of a paint stick of the marker installation apparatus can be increased so that the height of the handle is higher, or decreased so that the height of the handle is lower, to customize the height of the handle for the comfort of an individual user, without requiring a individually designed marker installation apparatus.

According to an embodiment in which a magazine assembly holds multiple markers and feeds then into the push position, a flipper assembly may be employed to deploy as one of the multiple markers in the magazine space is inserted in the ground and separated from the remaining markers in the magazine space, thereby preventing biasing force from the remaining markers from frictionally preventing an inserted marker from existing the magazine space.

According to an embodiment, a cart may be provided for the marker installation apparatus that includes magazine spaces containing flags for marking different items, such as different buried underground cables. The cart may include several complete marker installation assemblies, with different paint and different markers, or the cart may include several magazine assemblies with different markers and a common paint stick.

According to an embodiment, the marker installation apparatus may include multiple magazine assemblies stacked side by side, actuated by the same or different paint sticks, for easily switching from the marking of one type of buried utility line to the marking of another type of buried utility line.

These and other embodiments are described in more detail below.

BRIEF DESCRIPTION OF THE DRAWINGS

The disclosure will be better understood when consideration is given to the following detailed description thereof. Such description makes reference to the annexed drawings wherein:

FIG. 6 illustrates a front surface of a marker installation apparatus for engaging a marker, according to an embodiment.

FIG. 7 illustrates a rear surface of a marker installation apparatus for engaging a marker, according to an embodiment.

FIG. 8 is a schematic front view of the marker installation apparatus, according to the illustrative embodiment, shown with the cover removed to show the sliders.

FIG. 9 is a schematic perspective view of a portion of the marker installation apparatus, according to the illustrative embodiment, with the cover removed and portions of the base member broken away.

FIG. 18C is a schematic bottom view of a marker installation apparatus, according to an embodiment.

FIGS. 25A and 25B are schematic side view of a rear portion of marker engagement tab moving in the direction opposite the push position, causing the movable pivot portion to pivot into a position so that a flag from the magazine assembly can be advanced to the appropriate place to be inserted into the ground by the push assembly.

DESCRIPTION OF PREFERRED EMBODIMENTS

Figure 1:
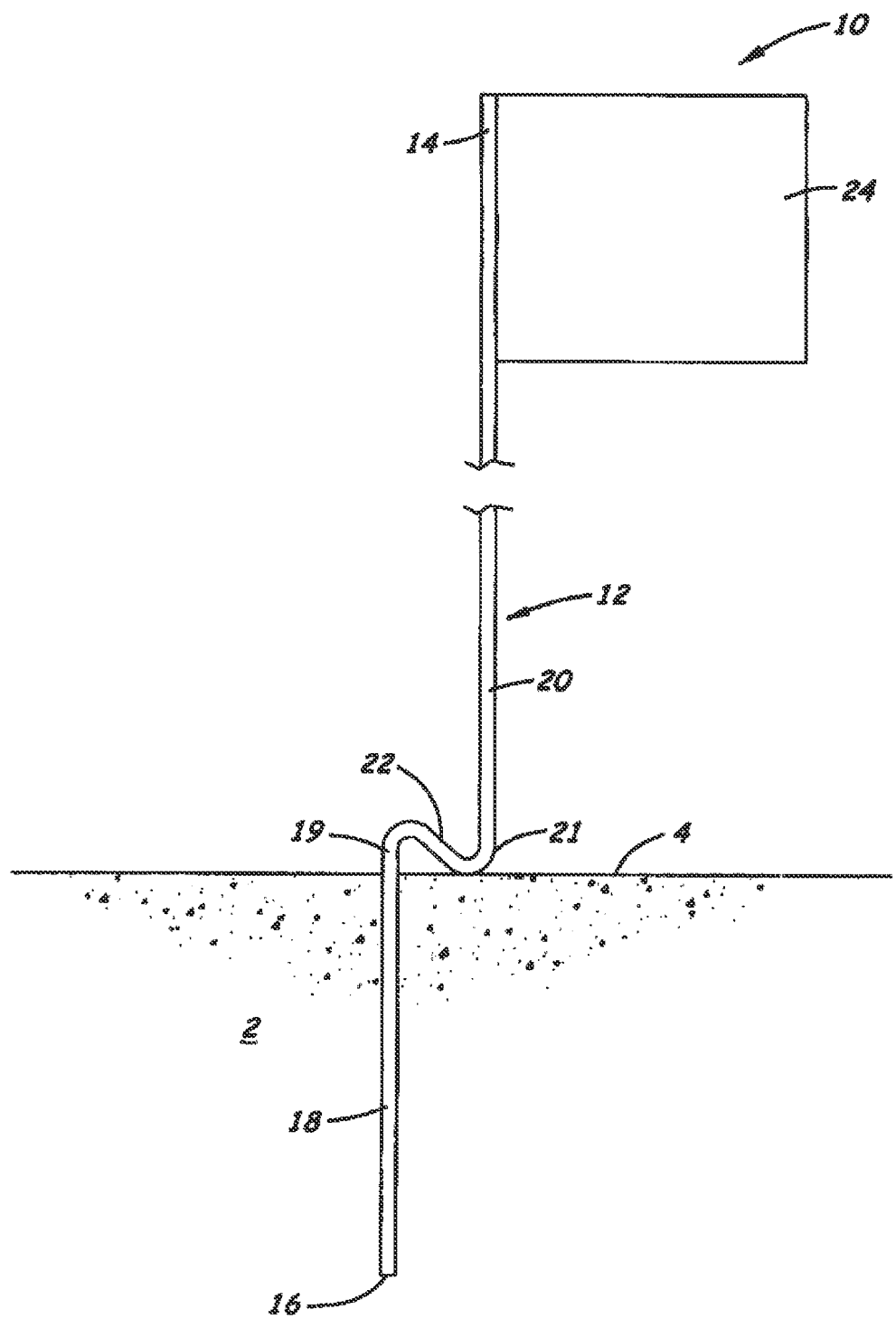
FIG. 1 is a schematic side view of a marker of a new marker installation system according to an illustrative embodiment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices may be shown in block diagram form in order to facilitate describing the claimed subject matter.

Moreover, the word "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In the following detailed description of embodiments according to the present disclosure, reference is made to the accompanying drawings which form a part hereof, and in which is shown by way of illustration specific preferred embodiments in which the system of the disclosure may be practiced. These embodiments are described in sufficient detail to enable those to be understood that other embodiments may be utilized and that logical, mechanical and electrical changes may be made without departing from the spirit or scope of the disclosure. To avoid detail not necessary to enable those skilled in the art to practice the systems and methods of the disclosure, the description may omit certain information known to those skilled in the art. The following detailed description is, therefore, not to be taken in a limiting sense, and the scope of the present disclosure is defined only by the appended claims.

With reference now to the drawings, and in particular FIGS. 1 through 34 thereof, various embodiments employing the principles and concepts of the present marker installation system generally designated by the reference number 1000, will be described.

One embodiment of the disclosure relates to a marker 10 which is highly suitable for marking a ground surface 4, although other applications of the marker 10 may be utilized for marking other objects into which a portion of the marker 10 may be inserted (see FIGS. 1 through 4). The marker 10 may be utilized for temporarily (or more permanently) marking on a ground surface 4 the location of various otherwise hidden features, including, but not limited to, the location of property boundaries, the location of utility lines buried under the ground surface 4, as well as the location of any other demarcations such as for example, game field boundaries or path boundaries. The marker 10 may also have other less utilitarian purposes such as for providing decorative additions to a ground surface 4 or to temporarily mark a path along a ground surface 4.

In greater detail, and as is illustratively shown in the drawings, the marker 10 may comprise a shaft 12 that is at least partially insertable through the ground surface 4 and into the ground 2 to provide a degree of resistance to prevent removal by, for example, wind or casual contact with passersby. The shaft 12 may have a top end 14 and a bottom end 16. The shaft 12 has a length that may be measured between the top 14 and bottom 16 ends. The shaft 12 may have a substantially uniform cross-sectional shape along the length of the shaft 12, and that shape may be substantially circular. It should be recognized that other cross sectional shapes of the shaft 12 may be employed, including, but not limited to, rectangular, square, triangular, oval, etc. The shaft 12 may be formed of a wire material, and the wire material may be relatively resistant to bending, but as will be appreciated from the following, the illustrative system 1000 employed to install the marker 10 may provide support to the shaft 12 as the marker 10 is being installed in the ground surface 4 and thus the wire does not have to be made of a highly rigid material.

The shaft 12 of the marker 10 may be conceptually divided into a number of portions that may have different purposes or functions. The shaft 12 may include an insertion portion 18 for insertion into the ground 2 through the surface 4 of the ground 2. The insertion portion 18 may be located toward the bottom end 16 of the shaft 12, and may be adjacent to the bottom end 16. The insertion portion 18 may be, and preferably is, substantially linear and straight, and extends along an axis A. This feature of the insertion portion 18 greatly facilitates the insertion of the shaft 12 into the ground 2, and reduces the degree of force that needs to be utilized to drive the insertion portion 18 into the ground 2, as the shaft 12 only presents a profile as large as the cross sectional area of the shaft 12, that must be inserted through the surface 4 and into the ground 2. The insertion portion 18 has an upper extremity 19 located substantially opposite of the bottom end 16 of the shaft 12 on the insertion portion 18.

The shaft 12 may further include a mast portion 20 for extending above the ground surface 4 when the insertion portion 18 is at least partially inserted into the ground 2. The mast portion 20 may be substantially linear and straight, and may extend along an axis B. The axis B of the mast portion 20 may be oriented substantially parallel to the axis A of the insertion portion 18. The axis B of the mast portion 20 is preferably, but not necessarily, laterally offset by a distance X from the axis of the insertion portion 18. The offset of axis A from axis B may be in the range of approximately 0.1 inch to approximately 1.0 inch, although other offsets may be employed. The mast portion 20 may include a lower extremity 21 that is located substantially opposite of the top end 14 of the shaft 12 located on the mast portion 20.

The shaft 12 may also include an engagement portion 22 that is located between the insertion portion 18 and the mast portion 20 of the shaft 12. The engagement portion 22 may connect the mast portion 20 to the insertion portion 18, and thus may extend between the upper extremity 19 of the insertion portion 18 and the lower extremity 21 of the mast portion 20. The extent of the engagement portion 22 may be a function of the offset between the axes of the insertion 18 and mast 20 portions so that the greater the offset, the larger the size of the engagement portion 22 and the smaller the offset, the smaller the size of the engagement portion 22.

In one significant embodiment of the marker 10, the engagement portion 22 may be configured to provide a location for positive engagement of the shaft 12 without increasing the cross sectional size of the portion of the marker 10 being inserted into the ground 2, and thus making the insertion more difficult in ground 2 that is, for example, compacted, stony, somewhat frozen, etc. The positioning of the insertion portion 18 between the bottom end 16 of the marker 10 and the engagement portion 22 where the positive engagement occurs does not require the engagement portion 22 to be inserted into the ground 2 when the marker 10 is inserted into the ground 2. Further, utilization of the engagement portion 22 may avoid relying solely upon friction between a driving apparatus and the marker 10 when inserting the marker 10 into the ground 2. The engagement portion 22 may extend along an axis C. The axis C of the engagement portion 22 may be oriented at a non-zero angle α to the axis A of the insertion portion 18. Although it is contemplated that angles α measuring greater than zero degrees and less than or equal to approximately 135 degrees may be utilized, it is believed that angles α measuring at or between approximately 5 degrees and approximately 95 degrees with respect to the axis A of the insertion portion 18 are the most effective for the purpose of providing a positive engagement with the shaft 12 for insertion of the shaft 12 into the ground surface 4. In some embodiments, the angle α may be in the range of approximately 30 degrees and approximately 60 degrees.

In still other embodiments, the angle α may be in the range of approximately 40 degrees and approximately 50 degrees. Illustratively, the angle α may be approximately 45 degrees.

Another function that the engagement portion 22 may provide to the marker 10 is its ability to resist or block further insertion of the shaft 12 into the surface 4 of the ground 2 when the engagement portion 22 contacts the ground surface 4, so that, for example, the marker 10 is not inserted in the ground 2 beyond the insertion portion 18.

Similarly, although not necessarily identically, the axis C of the engagement portion 22 is oriented at a non-zero angle β to the axis B of the mast portion 20. The axis B of the mast portion 20 may be oriented at an angle β that is similar or identical to the angle α between the insertion 18 and engagement 22 portions so that the mast portion 20 extends substantially straight upward when the insertion portion 18 in inserted in the ground 2. The values of angle β may thus be substantially the same as the values for angle α noted above, although identical values are not critical.

Although the insertion 18, mast 20, and engagement 22 portions may be angled and offset from each other in a first reference plane, it should be appreciated that the portions 18, 20, and 22 of the shaft 12 may lie in a common plane that is oriented substantially perpendicular to the first reference plane.

The length of the insertion, engagement, and mast portions 20 may vary. In some embodiments, the length of the insertion portion 18 is less than approximately 40% of an overall length of the marker 10 as measured from the bottom end 16 to the top end 14 (as contrasted with the actual length of the wire forming the shaft 12 between the top and bottom ends 16), and may be less than approximately 25% of the overall length. In one illustrative embodiment, the length of the insertion portion 18 is a minimum of approximately 5% of the overall length of the marker 10, and in some embodiments may be approximately 25% of the overall length. In some embodiments, the insertion portion 18 may have a minimum length of approximately 1 inch and a maximum length of approximately 12 inches. In one embodiment, the length of the insertion portion 18 is approximately 3 inches, and the overall length of the marker 10 is approximately 24 to approximately 30 inches.

Figure 4:
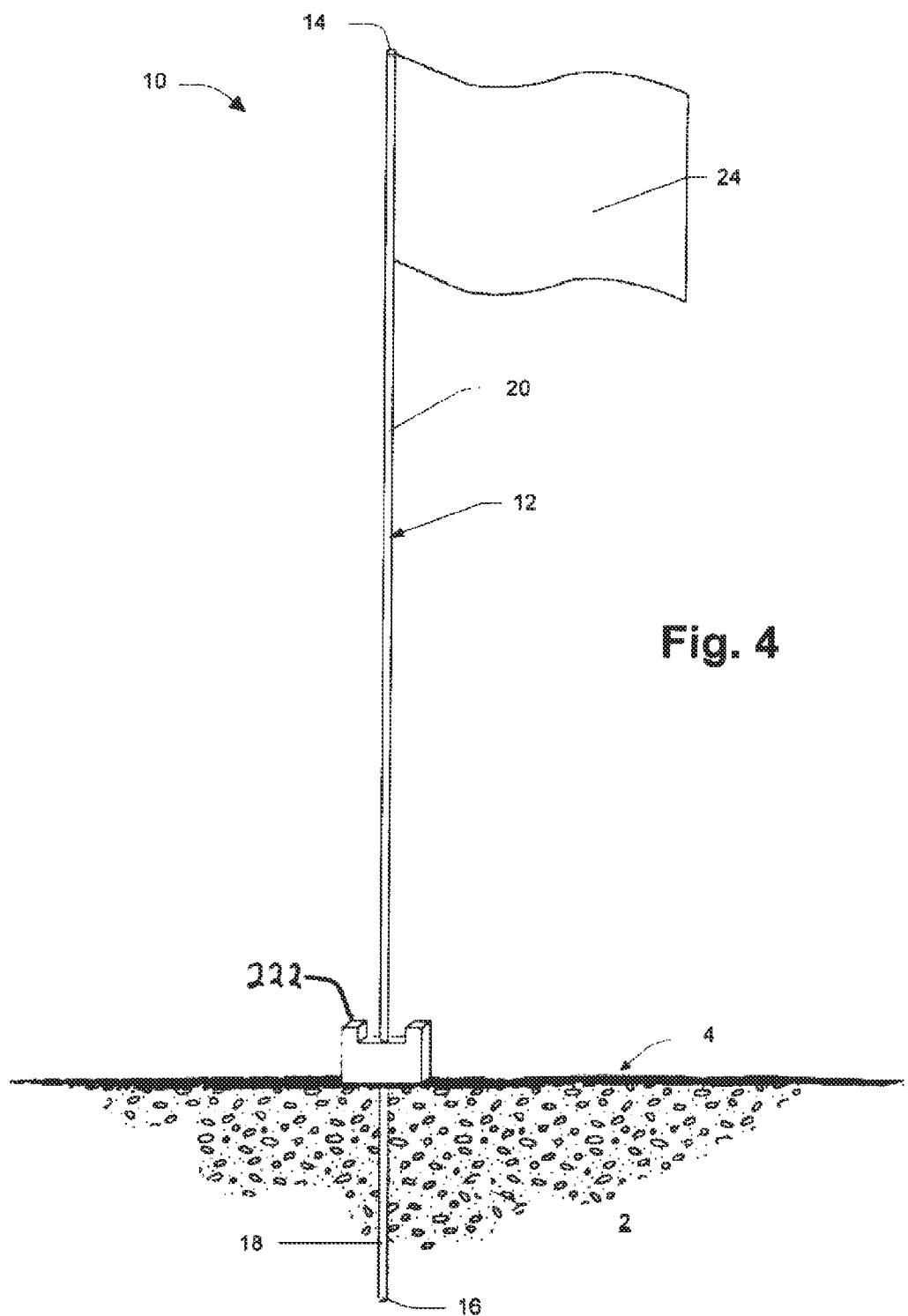
FIG. 4 illustrates a marker having an accessory engagement portion for engaging a marker, according to an illustrative embodiment.

With reference to FIG. 4, illustrated is an embodiment of an accessory engagement portion 23 for engaging a marker 10 to facilitate insertion of the marker 10 into a ground surface 4, according to an embodiment. The shaft 12 of the marker 10 is received by an aperture 27 of the accessory engagement portion 23, and held in place by friction or by some type of welding, braising, or the like. The insertion portion 18 of the marker 10 is shown inserted into the ground surface 4. The accessory engagement portion 23 is secured to or integrated with the marker 10 at a predetermined height between the insertion portion 18 and the mast portion 20 of the shaft 12. Although the accessory engagement portion 23 is illustrated as abutting the ground surface 4 in FIG. 4, the final position of the accessory engagement portions 23 can vary from any point above the ground surface 4 to beneath the ground surface 4. According to an exemplary embodiment, a marker installation apparatus 30 is used to insert the marker 10 with accessory engagement portion 23 into the ground surface 4. The installation apparatus 30 includes a push assembly 100 for engaging the accessory engagement portion 23. When actuated, the push assembly 100 pushes the accessory engagement portion 23 and the marker 10 into the ground surface 4 until a desired portion of the marker 10 is inserted into the ground surface 4.

According to an embodiment, the accessory engagement portion 23 is used to remove the marker 10 when it is no longer desired, by having a shape, indentation or other characteristic that facilitates grasping (e.g., by hand or by a removal apparatus) of the accessory engagement portion 23 so that a pulling force can be applied to the marker 10, removing it from the ground surface 4.

The accessory engagement portions 23 can abut the ground surface 4 according to some embodiments to provide a degree of stability to the marker 10, prevent bending or accidental removal of the marker 10 by, for example, the wind, animals, or casual contact with passersby.

FIGS. 5 through 8 illustrate various embodiments of accessory engagement portions 23 and the associated markers 10 linked or collated together (e.g., collated markers 25). Collated markers 25 are an alternative to loading a single marker 10 into a marker installation apparatus 30 at a time. Because the markers 10 are lightweight in construction, collation of the markers 10 into collated markers 25 results in a relatively lightweight collection of markers 10 that can be inserted into an appropriately equipped marker installation apparatus 30. Collation facilitates handling and loading of collated markers 25 into a marker installation apparatus 30 having a magazine assembly 32. An exemplary system 1000 may comprise a magazine assembly 32 defining a magazine space 34 where one or more markers 10 with accessory engagement portions 23 are positioned. The magazine space 34 has a push position for receiving one of the one or more markers 10. A push assembly 100 is mounted on the magazine assembly 32 for engaging the accessory engagement portions 23 of one of the one or more markers 10 positioned in the push position. The push assembly 100 pushes the marker 10 from the push position of the magazine assembly 32 when the push assembly 100 is actuated. A biasing assembly 80 can be employed to bias the multiple markers 10 with engagement portions 22 toward the push position, such that a marker 10 with engagement portion 22 is advanced to the push position after the previous marker 10 with attachment is inserted into the ground surface 4.

According to an embodiment, the markers 10 with accessory engagement portions 23 may be collated together on an outside surface of the marker 10 or the accessory engagement portion 23 by an elongated element. The elongated element (e.g., tape, glue, integrally molded tearable strip) extends across multiple markers 10 with accessory engagement portions 23 such that the elongated element is substantially positioned perpendicularly to any one of the multiple markers 10 with accessory engagement portions 23. Multiple collated markers 25 may be then installed into the magazine apparatus of an installation device to facilitate the insertion of markers 10 into a ground surface 4.

Figure 15:
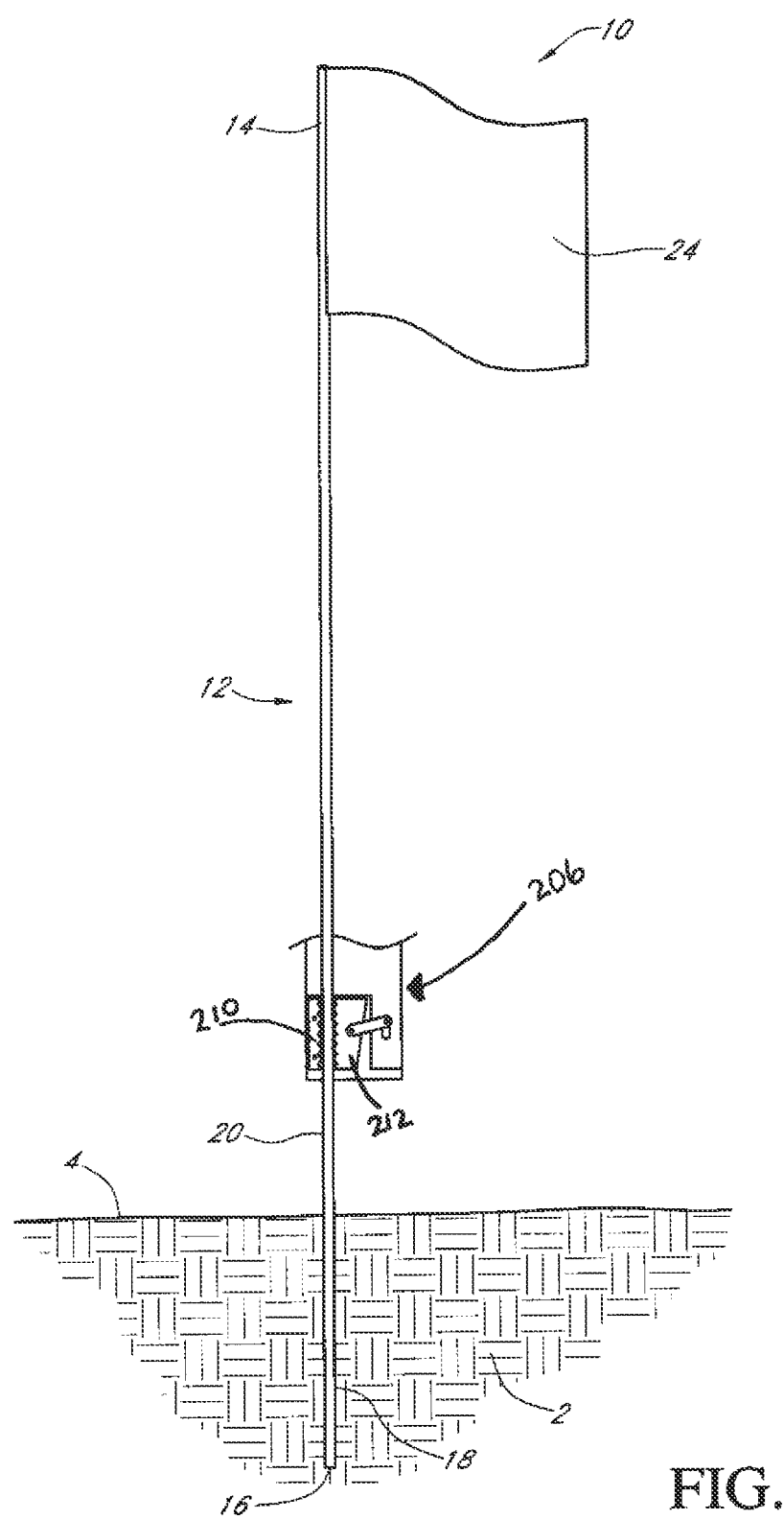
FIG. 15 illustrates a marker to be engaged by a marker installation apparatus, according to an embodiment.
Figure 16:
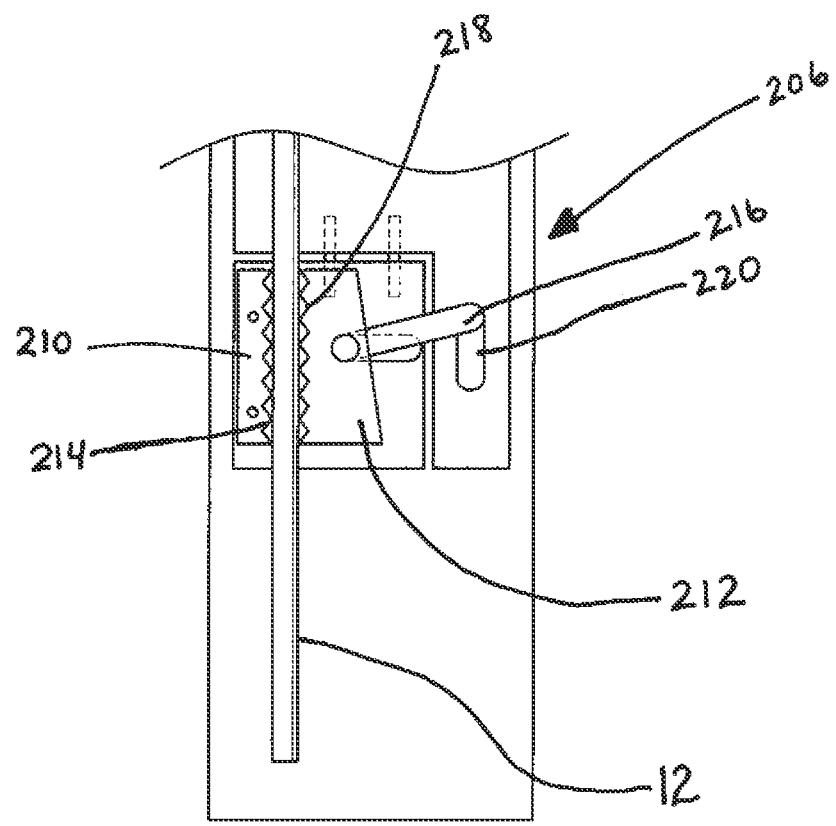
FIG. 16 illustrates a marker gripping apparatus in a marker engagement apparatus for engaging a marker, according to an embodiment.

FIGS. 15 and 16 illustrate other embodiments, and their implementation in a marker installation apparatus 30. In FIG. 15, a push assembly 100 (e.g., driver) engages the attachment (e.g., marker engagement device). In FIG. 16, the push assembly 100 is shown engaging the attachment of a marker 10 in the push position.

Preferably, but not critically, the marker 10 may also include a visual indicator 24 mounted on the shaft 12 that may increase the notice ability of the marker 10 and may convey information to a person viewing the indicator. In the illustrative embodiment, the visual indicator 24 comprises a flag 24 mounted on the mast portion 20 of the shaft 12. The flag 24 may be mounted toward the top end 14 of the shaft 12. The flag 24 may be formed of a flexible material, and may comprise a sheet material.

In some embodiments of the system 1000, a plurality of markers 10 may be grouped together (e.g., collated) to facilitate transporting, storing, and loading of the quantities of markers 10 that may be needed to complete the marking of, for example, a property boundary project. The plurality of markers 10 may be grouped and held together in any suitable manner that permits each of the markers 10 to be removed from the rest of the plurality when it is desired to insert the marker 10 into the ground 2. For example, an adhesive may bond a portion of the shafts of adjacent markers 10 in the plurality of markers 10 together, and a suitable adhesive would not prevent dislodgment of one marker 10 from the other markers 10 when force is applied to the one marker 10 in a direct parallel to the axis A of the marker 10. The markers 10 may be secured together in a planar arrangement that locates markers 10 on opposite sides of a marker 10 in the line of markers 10. In the grouping of a plurality of markers 10, the bottom ends 16 of each of the markers 10 may be aligned along an axis that is substantially perpendicular to 30 the axes A of the shafts, or the axis of the ends may be somewhat angled from the perpendicular so that the bottom ends 16 of each successive shaft 12 is positioned further back from the perpendicular line than the previous shaft 12 in the rank of markers 10 (see FIG. 10). The angle μ between the axis formed by the bottom ends 16 and the axes A of the shafts may be approximately in the range of approximately 0 degrees from the perpendicular to approximately 75 degrees from the perpendicular, and in some embodiments an angle μ of approximately 22.5 degrees is utilized.

Another embodiment of the marker installation system 1000 is directed to a marker installation apparatus 30 for inserting a marker 10 into, for example, a ground surface 4 (see FIGS. 4 through 9). The marker installation apparatus 30 may be employed to insert a portion of a marker 10, such as a marker 10 of the type described above, into the ground surface 4 in a relatively quick and easy manner, and may help to cause the markers 10 to be inserted in the ground 2 at a relatively uniform distance that produces markers 10 that extend above the ground 2 at a substantially uniform distance.

The marker installation apparatus 30 may generally include a magazine assembly 32 configured to hold at least one marker 10 in a push position on the magazine assembly 32, a push assembly 100 to push a marker 10 in the push position from the apparatus 30, and a biasing assembly 80 configured to bias markers 10 in the magazine assembly 32 toward the push position.

In greater detail, the magazine assembly 32 defines a magazine space 34 that is configured to receive at least one marker 10 (e.g., with an engagement portion 22 or an accessory engagement portion 23) and preferably a plurality of markers 10 positioned in an array of adjacent markers 10. The magazine assembly 32 may be elongated and may have a top end 36 and a bottom end 38, with a longitudinal direction extending through the top 36 and bottom 38 ends. The top end 14 and bottom end 16 designations refer to the orientation of the apparatus 30 when it is positioned for use in placing a marker 10 in a ground surface 4.

The magazine assembly 32 may include a base member 40 that may extend from the top end 36 to the bottom end 38 of the magazine assembly 32. The base member 40 may have a rear wall 44 with a front 48. The magazine assembly 32 may further include a first side member 46 that is mounted on a first side of the base member 40, and a second side member 50 that is mounted on a second side of the base member 40. The first 46 and second 50 side members may thus be positioned on opposite sides of the base member 40. In the illustrative embodiments, the first side member 46 and the second side member 50 each have a channel shape that receives a portion of the respective side of the base member 40. Optionally, the first side member 46 and the second side member 50 may be combined with the base member 40, and thus may not be formed of parts separate from the part of the base member 40.

A barrel bore 52 may be formed by elements of the magazine assembly 32. In the illustrative embodiment, the barrel bore 52 may be formed by an inner surface of the second side member 50 and a surface of the second side of the base member 40, and may be formed in a gap between these elements (see FIG. 8). A tab slot 54 may also be formed between the second side member 50 and the base member 40, and the tab slot 54 may be in communication with the barrel bore 52 and the magazine space 34. The barrel bore 52 may extend from the bottom end 38 of the base member 40 toward the top end 36 of the base member 40. The tab slot 54 may also extend from the bottom end 38 toward the top end 36 of the magazine assembly 32.

The magazine assembly 32 may further comprise a support member 56 that is mounted on the base member 40. The support member 56 may be positioned forward of the front 48 of the rear wall 44, or may be formed as an integral portion of the base member 40. The support member 56 may have a front surface 58, and markers 10 positioned in the magazine space 34 may be abutted against the front surface 58, and may be housed between the front surface 58 and the cover member 66. The support member 56 may form at least one guide channel 60, and the guide channel 60 may extend laterally with respect to the longitudinal direction of the magazine assembly 32. The magazine assembly 32 may include more than one support member 56, and may define more than one guide channel 60. In the illustrative embodiments, the lowermost guide channel 60 receives the engagement portion 22 and the insertion portion 18 of the marker 10, while the mast portion 20 may rest against the front surface 58 of the support member 56. An ejection aperture 76 may be located in the bottom end 38 of the base member 40 to permit the movement of a marker 10 out of the magazine space 34, and the ejection aperture 76 may be in communication with the magazine space 34 in which the markers 10 are stored, and may be aligned with the push position of the marker 10 in the magazine space 34, so that a marker 10 may be ejected out of the magazine space 34 through the ejection aperture 76.

The support member 56 may define a shoulder 62 for abutting against the engagement portion 22 of markers 10 positioned in the magazine space 34 of the magazine assembly 32. A plurality of the markers 10 may be arrayed along the shoulder 62 in the magazine space 34, although only one is shown in the drawings for the sake of clarity of illustration. The shoulder 62 may be partially formed by the front surface 58 of the support member 56, and may extend across the support member 56 laterally in a direction that is substantially transverse to the longitudinal direction of the magazine assembly 32. The shoulder 62 may extend at an angle Δ with respect to a line oriented substantially perpendicular to the barrel bore 52, and the angle Δ may be substantially equal to the angle of the bottom end 38 of the magazine assembly 32 with respect to a line perpendicular to the barrel bore 52. The angle Δ may measure between approximately 0 degrees and approximately 75 degrees from a line oriented perpendicular to the axis of the barrel bore 52. In the illustrative embodiment, the angle Δ is approximately 22.5 degrees.

Figure 5:
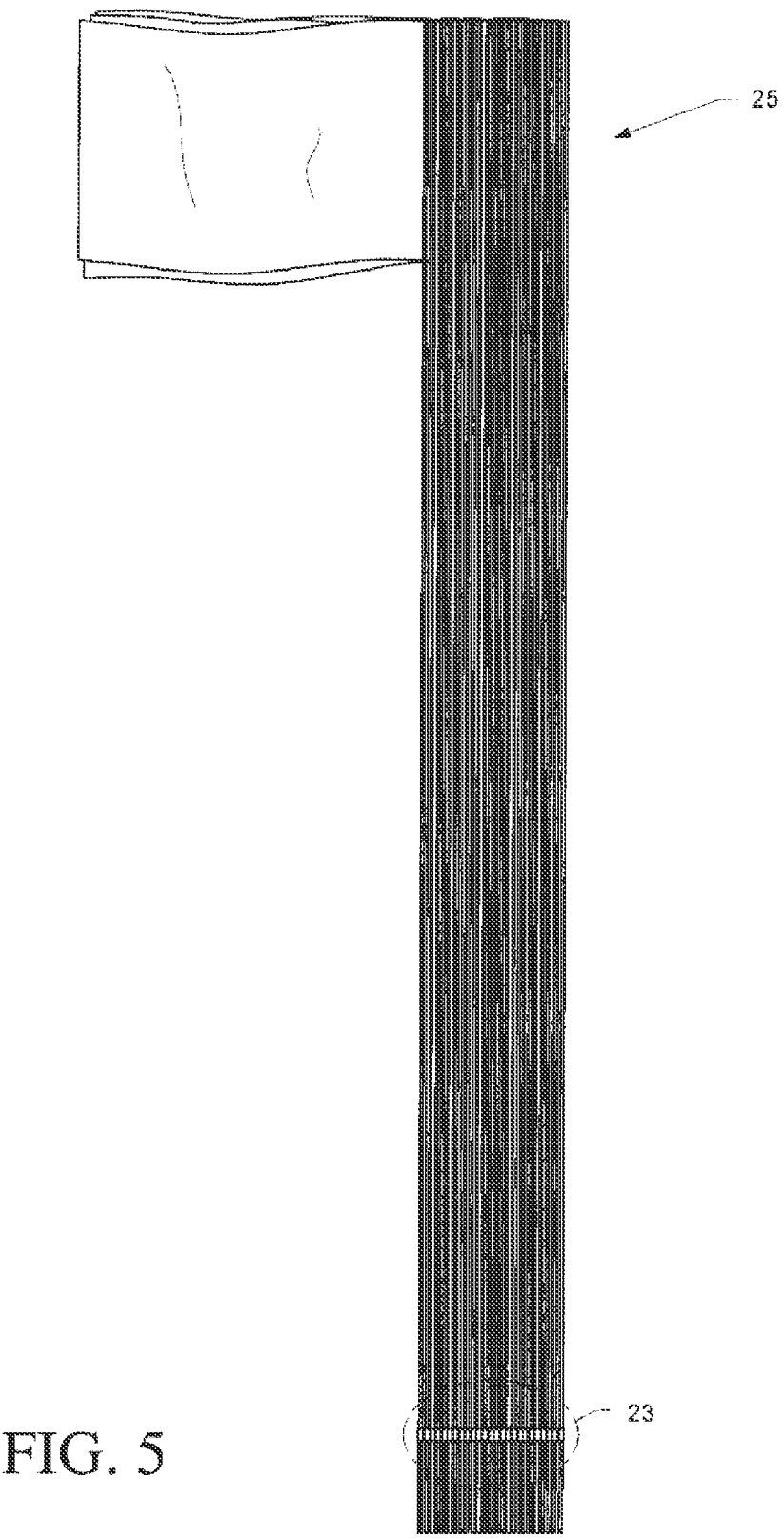
FIG. 5 is a schematic top view of the lower portions of a grouping of a plurality of markers (e.g., collated markers) according to an illustrative embodiment.
Figure 10:
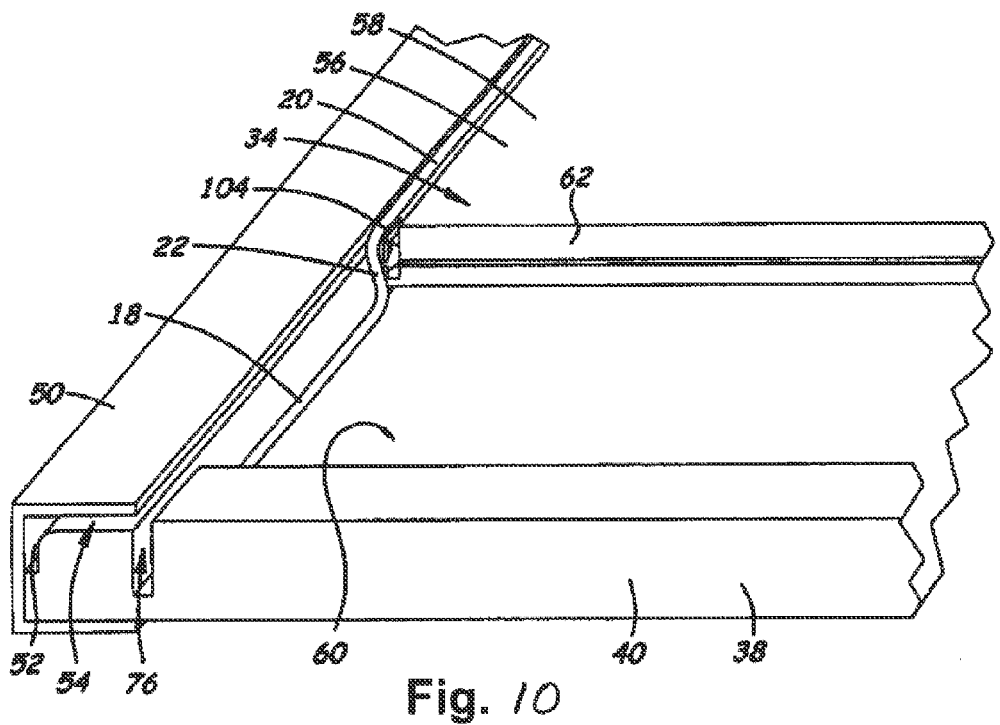
FIG. 10 is a schematic perspective view of a portion of the marker installation apparatus, according to the illustrative embodiment, with the cover member removed and portions of the base member broken away to show the engagement between the marker and the installation apparatus.

The magazine assembly 32 may also include a cover member 66 mounted on the base member 40. The cover member 66 may be mounted in a manner that permits movement of the cover member 66 with respect to the base member 40 to open up and expose a portion of the magazine space 34 to permit loading of markers 10 into the magazine space 34. The cover member 66 may be movable between a closed position and an open position. The closed position may be characterized by the cover member 66 covering at least a portion of the front surface 58 of the support member 56 to retain the markers 10 in the magazine space 34 against the front surface 58 of the support member 56. FIGS. 4 through 6 show the cover member 66 is a partially open position, but the cover member 66 is almost in the closed position. The cover member 66 may be close to the second side member 50 and barrel bore 52. The open position of the cover member 66 may be characterized by the cover member 66 exposing at least a portion of the front surface 58 of the support member 56 so that markers 10 may be placed against the front surface 58 to load the magazine space 34. The closed position of the cover member 66 may be characterized by the cover member 66 completely, or substantially completely covering the magazine space 34. In the closed position, the cover member 66 may only partially cover the magazine space 34 so that elements of the markers 10, such as the flags of the markers 10, are able to extend out of the magazine space 34 past the cover member 66. This relationship may also serve to provide the user with a visual indication of the number of markers 10 remaining in the magazine space 34 when the cover member 66 is in the closed position.

The magazine assembly 32 may further include a cover support structure 68 that is configured to support the cover member 66 at least in the open position of the cover member 66, and as the cover member 66 moves from the closed position toward the open position. The cover support structure 68 may also guide the movement of the cover member 66 between the open and closed positions. In the illustrative embodiment, the cover support structure 68 includes one or more supports shafts 72, 73 that are mounted on a flange 204 of the cover member 66 and that extend through respective apertures formed in the first side member 46. The support shafts 72, 73 permit movement of the cover member 66 between the open and closed positions while guiding the movement of the cover member 66. The cover member 66 may also include a guide member 69 that is located on a lower end of the cover member 66. The guide member 69 may form a channel or pocket-like structure that receives the bottom end of the base member 40, and the bottom end moves in the channel as the cover member 66 moves between the open and closed positions. The guide member 69, as well as the support shafts 72, 73 may be positioned in an orientation that causes movement of the cover member 66 that is angled somewhat with respect to the line perpendicular to the bore 52, such as a path that is oriented at the angle γ. Optionally, a path that is oriented substantially perpendicular to the axis of the barrel bore 52 may be employed. The cover member 66 may also include at least one guide slot 70, and preferably includes a plurality of guide slots 70, 71 that extend into the cover member 66, although the slots may not completely extend through the cover member 66. For example, the slots 70, 71 may be covered as shown in FIGS. 4 and 6.

The installation apparatus 30 may also include a biasing assembly 80 that is configured to bias at least one marker 10 positioned in the magazine space 34 (or more than one marker 10, if a plurality of markers 10 is positioned in the magazine space 34) toward the push position on the magazine assembly 32. The push position may be located at one side of the magazine space 34, and may be aligned with the ejection aperture 76. FIG. 7 shows a single marker 10 in the magazine space 34, and it is located in the push position, which is located to the extreme left in the magazine space 34. It should be recognized that, while one marker 10 is illustrated for the purposes of clarity, several of the markers 10 may be located in the magazine space 34 and would be positioned to the right of the marker 10 shown in FIG. 7, with the visual indicators of those markers 10 being stacked on top of the visual indicator 24 of the marker 10 in the push position. The plurality of markers 10 would be moved toward the push position by the biasing assembly 80 so that the markers 10 are positioned toward the left in the magazine space 34, and as one marker 10 is ejected from the push position, another marker 10 (if present) is biased or slid into the push position by the biasing assembly 80. The biasing assembly 80 may be mounted on the magazine assembly 32, and may be mounted on the support member 56 of the magazine assembly 32. In the exemplary embodiment, two of the biasing assemblies are employed, although more or less of the biasing assemblies may be employed.

In some embodiments, the biasing assembly 80 includes a slider member 82 that is mounted on the base member 40, preferably in a slidable relationship with the base member 40. Illustratively, the biasing assembly 80 includes a pair of slider members 82, 84, and each of the slider members 82 may be positioned in a guide channel 60. The slider members 82, 84 may be slidable toward the push position, with a retracted position and an extended position. The extended position may be located toward the push position on the magazine assembly 32 and the retracted position may be at a location that is spaced from the extended position toward the first side member 46 of the main portion of the base member 40. The slider member 82 may be biased and moved toward the push position of the magazine space 34 by a biasing element 90. The biasing element 90 may be of any known configuration that is suitable and effective for moving the slider member 82 toward the push position.

Figure 11:
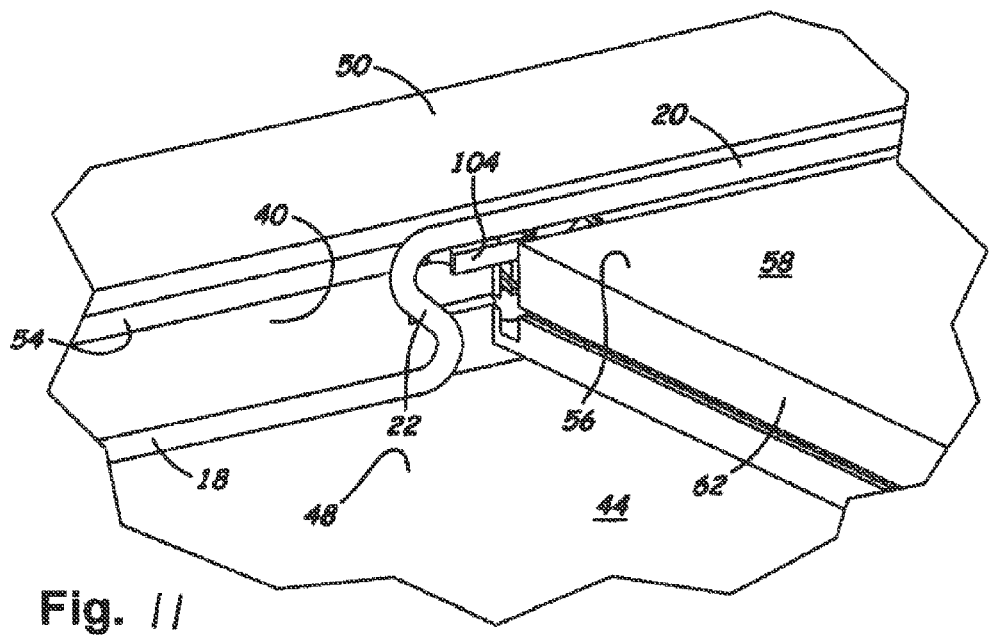
FIG. 11 is a schematic perspective view of a portion of the marker installation apparatus, according to the illustrative embodiment, with the cover member removed and portions of the base member broken away to show the engagement between the marker and the installation apparatus.
Figure 12:
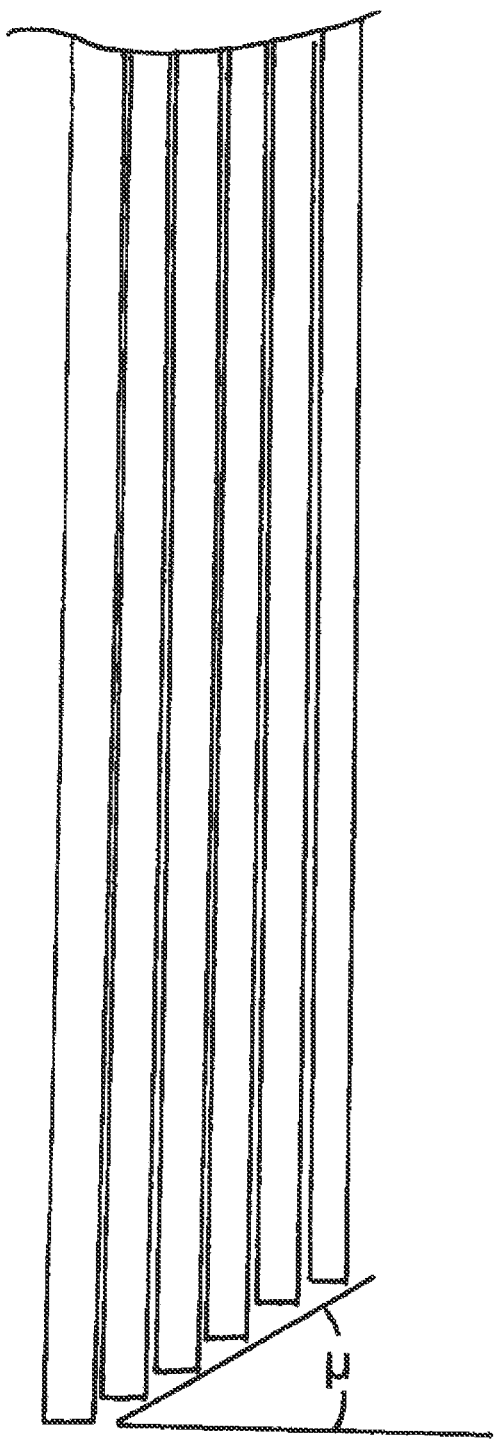
FIG. 12 is a schematic side view of a plurality of markers configured in a stepped arrangement.
Figure 13:
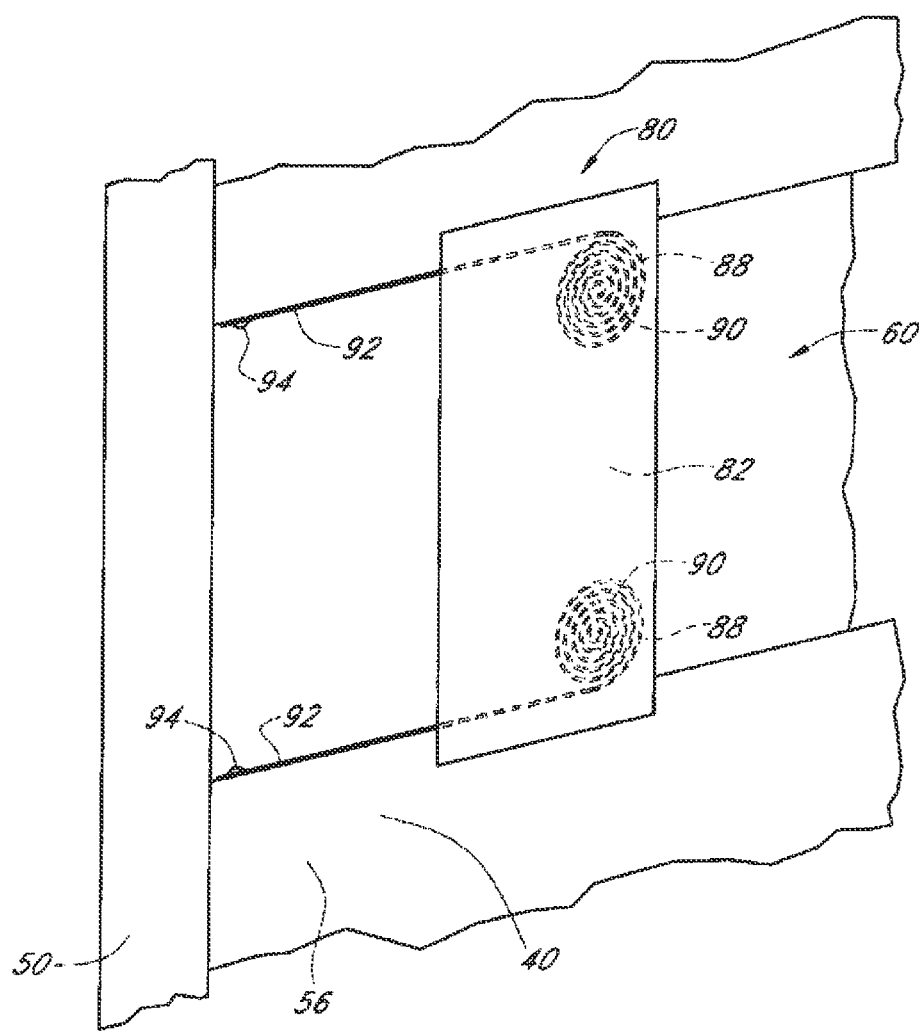
FIG. 13 is a schematic top view of a portion of the base member showing one of the slider members and the biasing assembly.
Figure 14A:
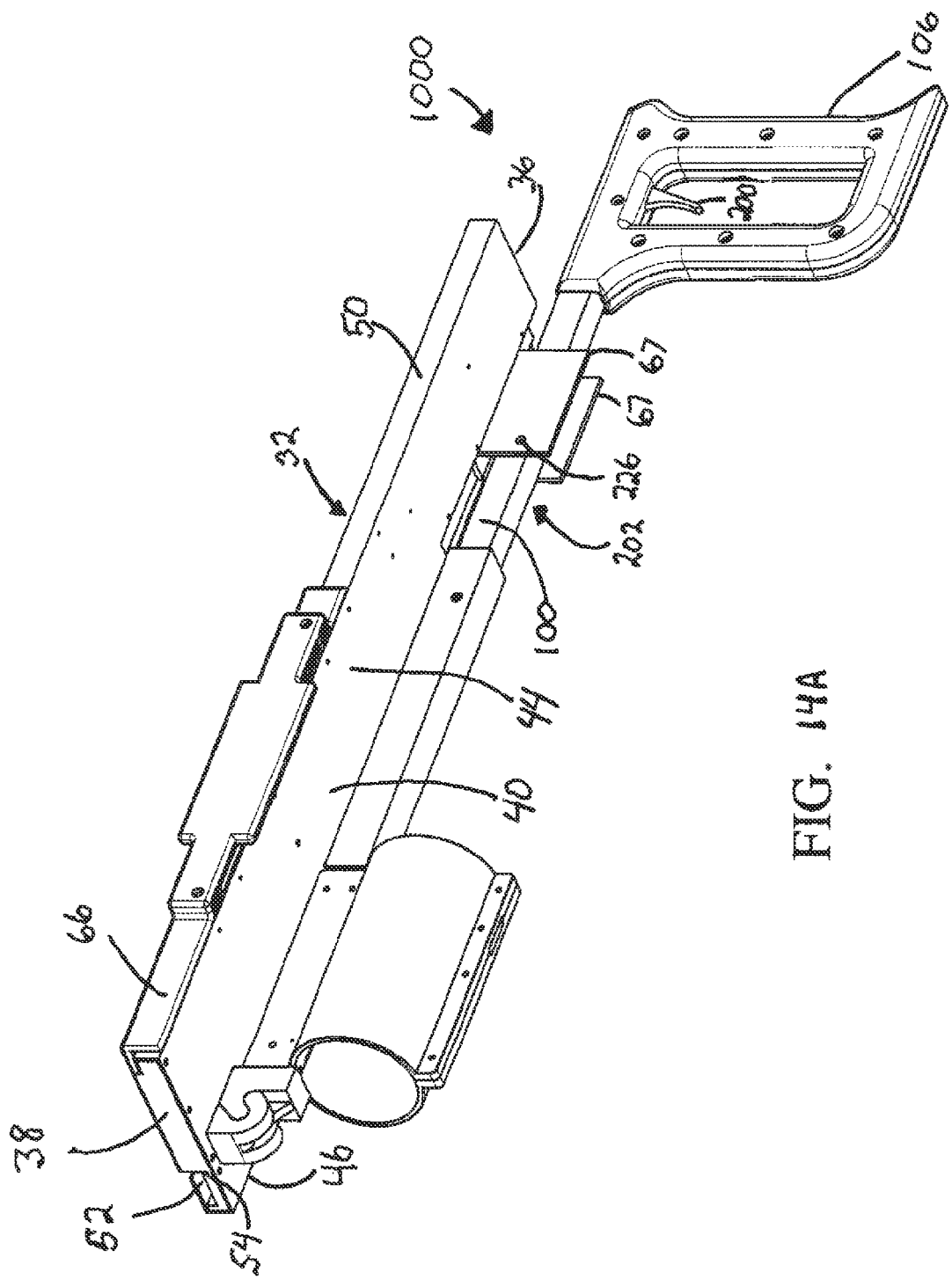
FIGS. 14A and 14B are schematic perspective views of the marker installation apparatus, according to illustrative embodiments, with the cover member engaged.
Figure 14B:
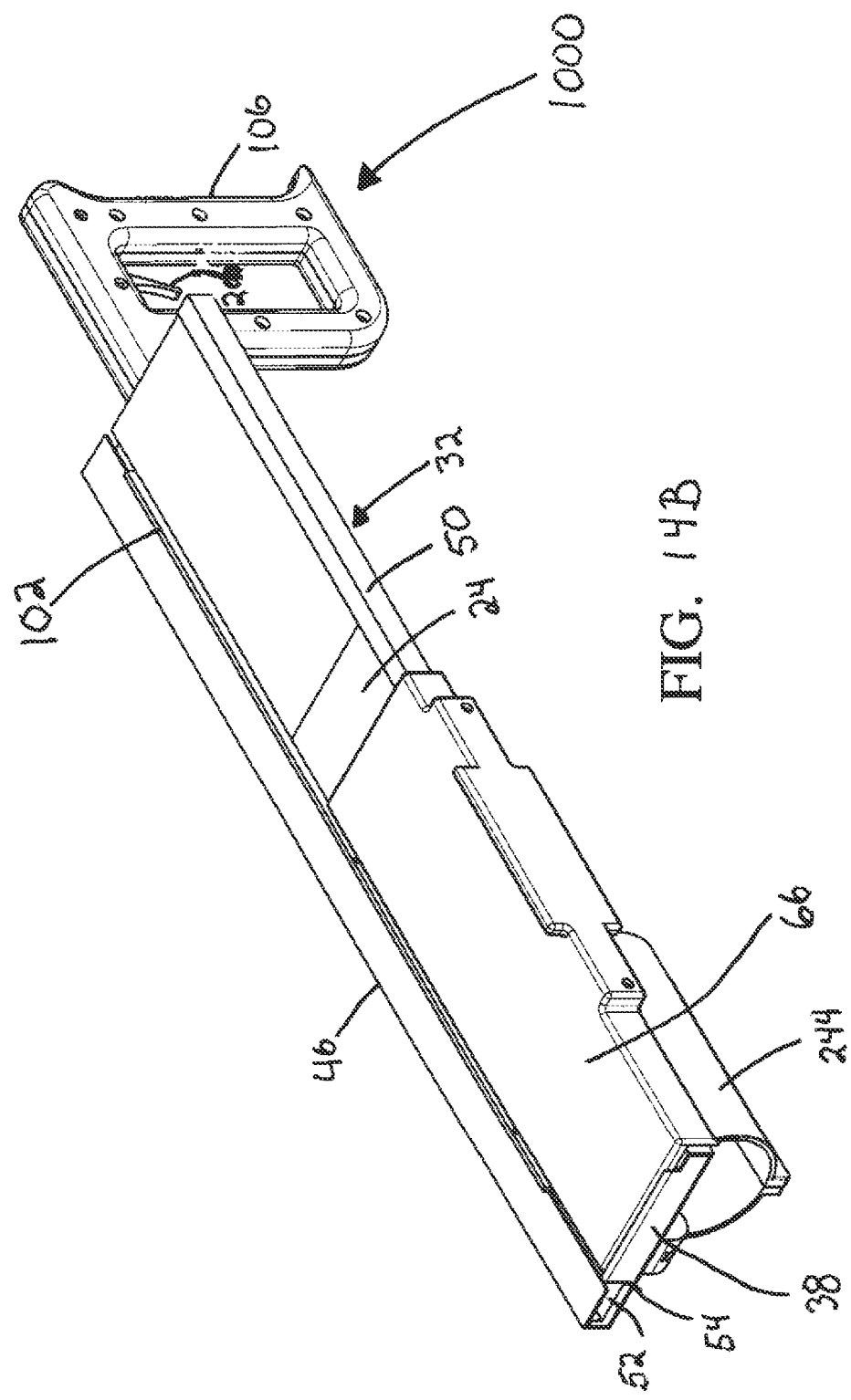

In some embodiments, such as is illustratively shown in FIG. 11, the biasing element 90 is a coiled spring 90 positioned in a well 88 forming in the slider member 82, and each slider member 82, 84 may include a pair of the wells 88 formed therein with a spring 90. The spring 90 may be of the mainspring type that may be unwound from the coil upon the application of force, but resists the unwinding from the coiled configuration, and seeks to resume the coiled configuration when the force is removed. An end portion 92 of the spring 90 may extend out of the well 88 and through the side of the slider member 82 and may be attached to the base member 40 by a fastener 94, so that movement of the slider member 82 away from the push position causes the spring 90 to be unwound from the coil and withdrawn from the well 88. The unwinding of the spring 90 by movement of the slider member 82 away from the push position tends to be resisted by the spring 90, and tends to bias the slider member 82 toward the push position. Movement of the slider member 82 away from the push position requires the application of force, such as by finger or hand pressure, to load one or more markers 10 into the magazine space 34. Upon release of the force from the slider member 82, the slider member 82 moves toward the push position as the springs 90 try to recoil from the partially uncoiled condition. Of course, while the described spring 90 (e.g., spring biasing element, biasing element) is highly compact and useful, the biasing element 90 may comprise other structures such as, for example, compression and tension springs 90.

Each of the slider members 82, 84 may have a top surface with a guide post 86 mounted thereon, and the guide post 86 may be movable in a respective one of the guide slots 70, 71 formed in the cover member 66. The slider members 82, 84 are thus moveable with respect to the cover member 66, but are confined to movement within the respective guide slot 70, 71. Advantageously, the movement of the cover member 66 from the closed position toward the open position causes the slider members 82, 84 to be moved away from the push position in the magazine space 34 to permit the insertion of additional markers 10 in the magazine space 34 between the slider members 82, 84 and the push position. The slider member 82 may be positioned in the guide channel 60 which may serve to guide the movement of the slider member 82 with respect to the base member 40. The slider member 82 may have a height that is somewhat taller or higher than the front surface 58 of the support member 56 so that the slider member 82 protrudes out of the guide channel 60 and is able to engage and press against the markers 10 to move them along the support member 56.

The installation apparatus 30 may further comprise a push assembly 100 that is configured to push a marker 10 from the magazine assembly 32 when the user actuates the push assembly 100. More specifically, the push assembly 100 is able to push a marker 10 located in the push position from the magazine assembly 32 through the ejection aperture 76 in a manner so that the marker 10 enters, for example, a ground surface 4 positioned below the bottom end 38 of the installation apparatus 30.

The push assembly 100 may include a push member 102 that is mounted on the base member 40 in a manner that permits movement of the push member 102 with respect to the base member 40. The push member 102 may have a portion that is movable in the barrel bore 52 and the tab slot 54 of the base member 40. The push member 102 may have a marker engagement tab 104 that moves with the push member 102 and is configured to engage the particular marker 10 located in the push position. The marker engagement tab 104 may extend from the interior of the barrel bore 52 through the tab slot 54 into the magazine space 34 and into the push position, which may be located adjacent to the tab slot 54. The marker engagement tab 104 may have a curved lower surface that positioned to engage or hook the engagement portion 22 of the marker 10 when the push member 102 is moved in the barrel bore 52 in a downward direction. The curved lower surface is highly suitable for engaging the cylindrical outer surface of the marker 10.

Significantly, the marker engagement tab 104 of the push member 102 engages the engagement portion 22 of the marker 10 in the push position and applies the push insertion force to the marker 10 at the engagement portion 22. The engagement portion 22 of the marker 10 may be located toward, but preferably not at, the bottom end 16 of the marker 10, so that the insertion force applied by the push member 102 does not have to be transmitted, for example, through the entire length of the marker 10, which would be the case if the push member 102 acted on the top end 14 of the marker 10. In a preferred embodiments of the system 1000, neither the push member 102 nor the marker engagement tab 104 needs to extend out of the magazine assembly 32 (such as out of the barrel bore 52) when the push assembly 100 is actuated to push or eject the marker 10 from the magazine assembly 32, and thus the push member 102 does not penetrate the ground surface 4 as the insertion portion 18 of the shaft 12 of the marker 10 is inserted into the ground 2 (although that it should be recognized that there may be a small amount of protrusion by the end of the member 102). By engaging the engagement portion 22 of the marker 10 shaft 12 which is spaced from the bottom of the shaft 12, the push assembly 100 is able to push the marker 10 through the ejection aperture 76 into the ground surface 4 without entering the ground surface 4. Moreover, the engagement portion 22 tends to function to block further insertion of the shaft 12 into the ground surface 4 beyond the insertion portion 18 as the engagement portion 22 contacts the ground surface 4.

The push assembly 100 may also include a handle member 106 that is configured to move the push member 102 with respect to the base member 40. The handle member 106 may be mounted on the push member 102 at a location substantially opposite of the marker engagement tab 104, and adjacent to the top end 36 of the magazine assembly 32 so that the handle member 106 is located at the top of the installation apparatus 30 when the installation apparatus 30 is positioned for use.

With the installation apparatus 30, insertion of many markers 10 may be easily and quickly accomplished in rapid succession, with minimal bending by the user. Since the force applied to each marker 10 is applied at the engagement portion 22, relatively close to, but not at, the bottom end 16 of the marker 10, the marker 10 is less likely to deflect when the end 16 encounters hard ground 2.

According to another embodiment of the marker installation system 1000, the marker installation apparatus 30 is used to insert a marker 10 into, for example, a ground surface 4. The system 1000 generally includes a paint stick 202, a magazine assembly 32 attached to the paint stick 202, the magazine configured to hold at least one marker 10 in a push position on the assembly, a push assembly 100 to push a marker 10 in the push position from the apparatus, and a biasing assembly 80 configured to bias markers 10 in the magazine assembly 32 toward the push position. The push assembly 100 also includes a marker gripping apparatus 206 for selectively gripping a marker 10 in the push position and a flipper assembly 208 for lifting the marker 10 away from the magazine assembly 32 as the push assembly 100 is advanced from the push position to a marker insertion position (e.g., a position in which the marker 10 is pressed from the push position and into a ground surface 4). The flipper assembly 208 additionally serves to prevent a subsequent flag from entering the push position until the current flag is placed in the ground and the device is fully extended.

According to embodiments as shown in FIGS. 1 through 34B, the marker 10 (e.g., a flag having a shaft, such as a wire) is loaded into the apparatus into a push position. The marker installation apparatus 30 includes a push assembly 100 for engaging the shaft 12 of the marker 10 in the push position and pushing the marker 10 with attachment into the ground surface 4 to a desired depth.

The marker installation apparatus 30 can comprise an extendable paint stick 202, and a marker installation magazine 32 (e.g., magazine assembly). The marker installation magazine 32 can include a magazine space 34 with a push assembly 100 (shown in FIG. 11) having a first end and a second end. The first end of the push assembly 100 has a surface for engaging a marker 10 in the push position of the magazine 34. The second end of the push assembly 100 has a flange 67 extending through the rear wall 44 of the magazine assembly 32. According to an embodiment, the second end of the push assembly 100 has two or more flanges 67 parallel to the longitudinal axis of the push assembly 100. The flanges extend through the rear wall 44 in a channel such that the flanges 67 and the associated push assembly 100 can move up and down in relation to the magazine space 34, engaging a marker 10 in a down stroke and inserting the marker 10 into a ground surface 4. The two or more flanges 67 extend through the rear wall 44 and surround an attachment portion 234 of the extendable paint stick 202. A securing pin 224 (FIG. 27A) runs through matching apertures 226 in the first and second flanges and the attachment portion 234 of the extendable paint stick 202 secures the push assembly 100 to the attachment portion 234 of the extendable paint stick 202.

The paint stick 202 includes at least a receiving component 230 and a nesting component 232. The receiving component 230 receives the nesting component 232 so that the nesting component 232 can move longitudinally freely within the receiving component 230, unless a securing pin (not shown) is used to secure the two component rigidly together when the paint stick 202 is not attached to the push assembly 100 of the magazine assembly 32. The securing pin can be removed and repositioned such that the paint stick 202 can be used independently of the magazine assembly 32.

According to an embodiment, the attachment portion 234 of the paint stick 202 is located on the nesting component 232, above the point at which the nesting component 232 enters the receiving component 230, such that that nesting component 232 and an attached flange 67 (e.g., and associated push assembly 100) can move up or down longitudinally in relation to the receiving component 230 and the magazine assembly 32, which is parallel to the receiving component 230.

Figure 21A:
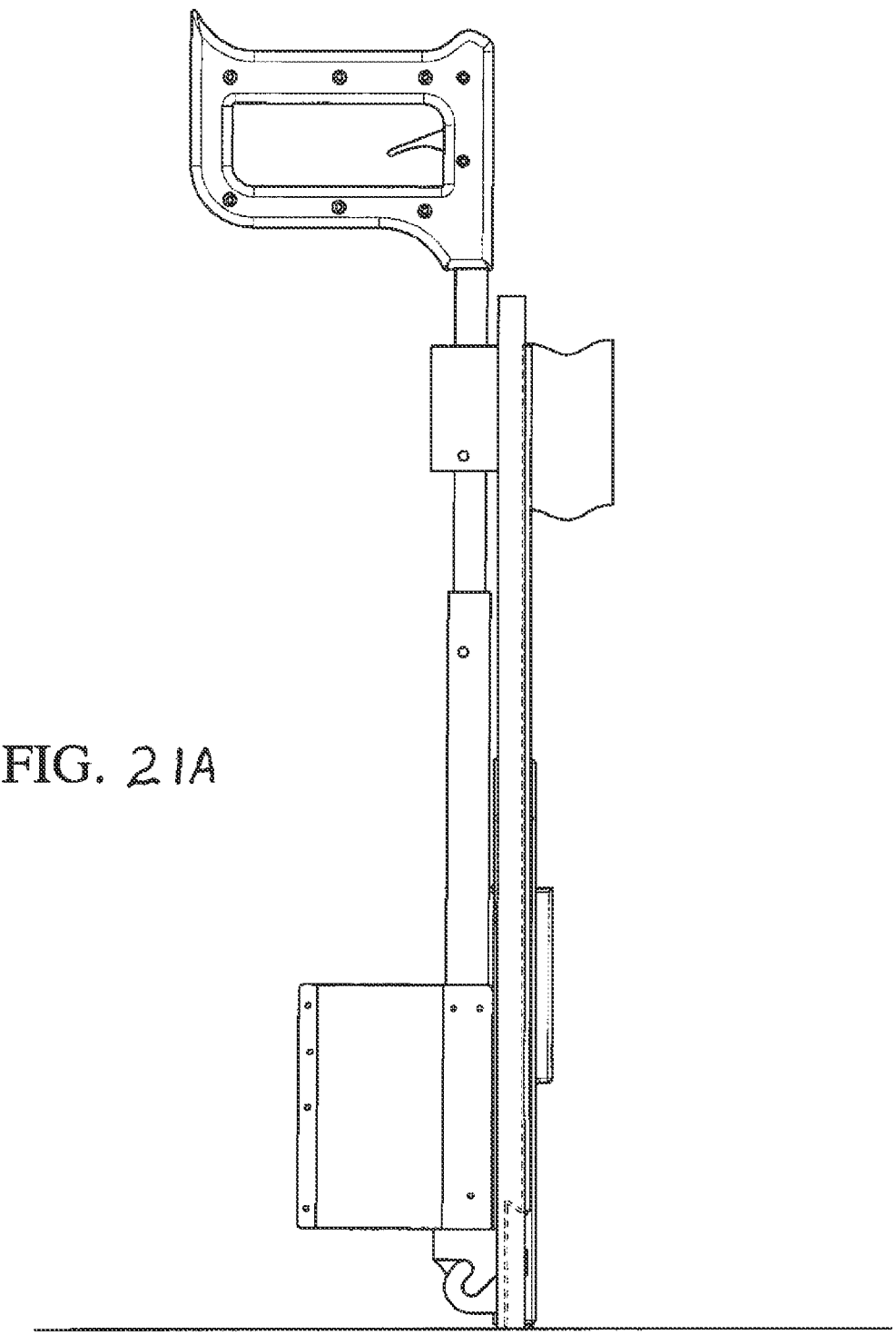
FIGS. 21A through 21C are schematic side views of the marker installation apparatus installing a marker.
Figure 21B:
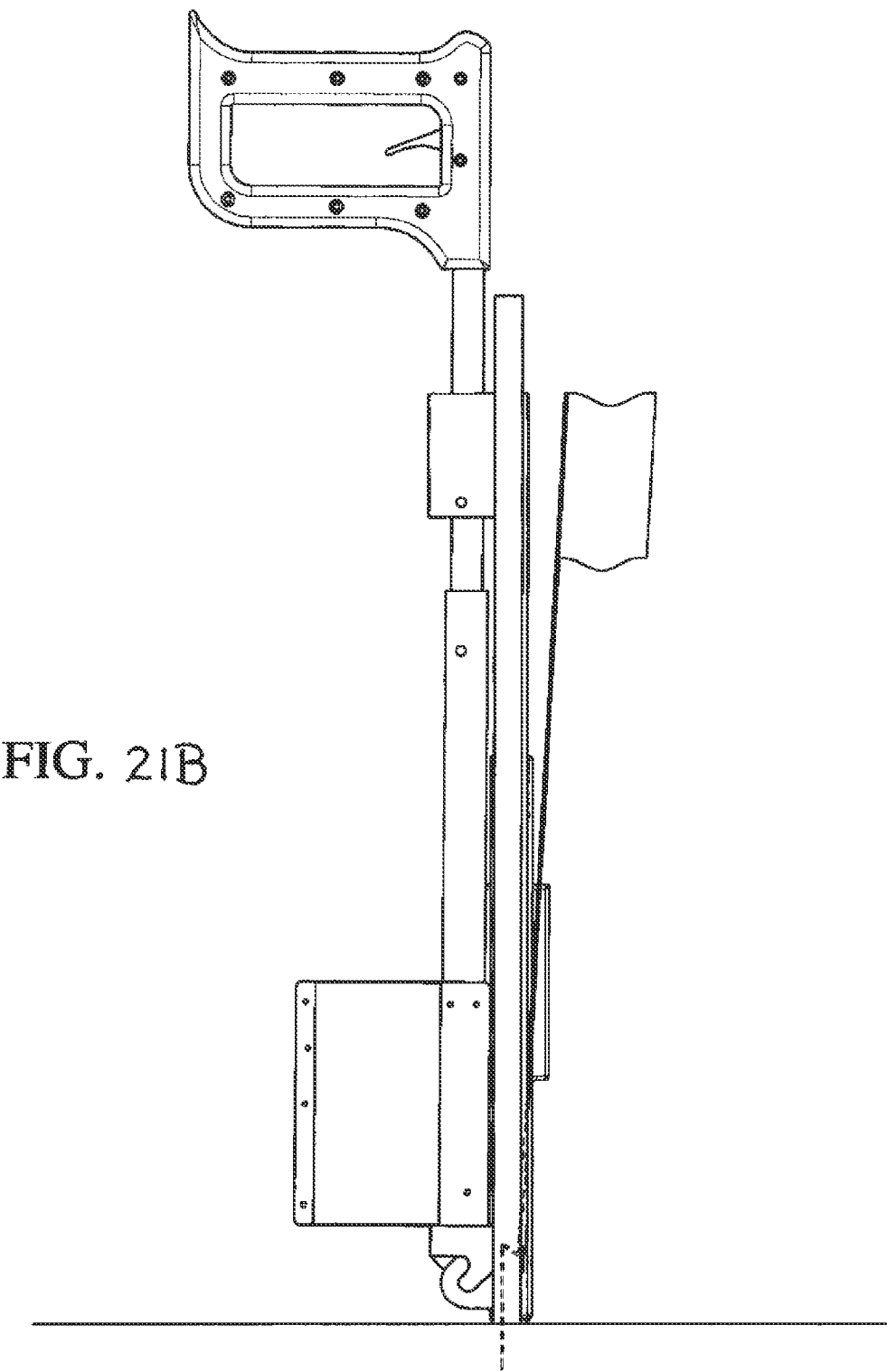
Figure 21C:
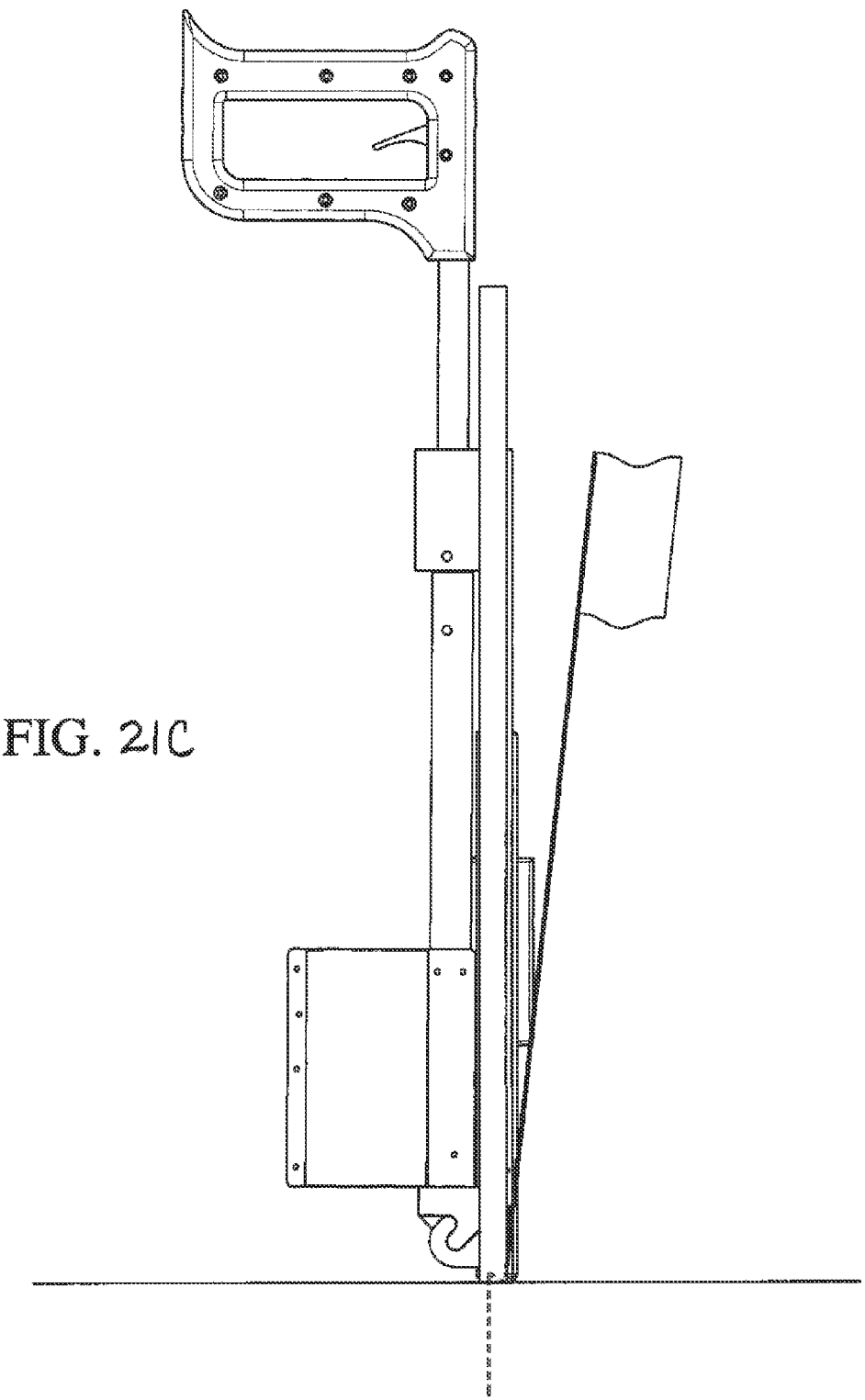
Figure 22:
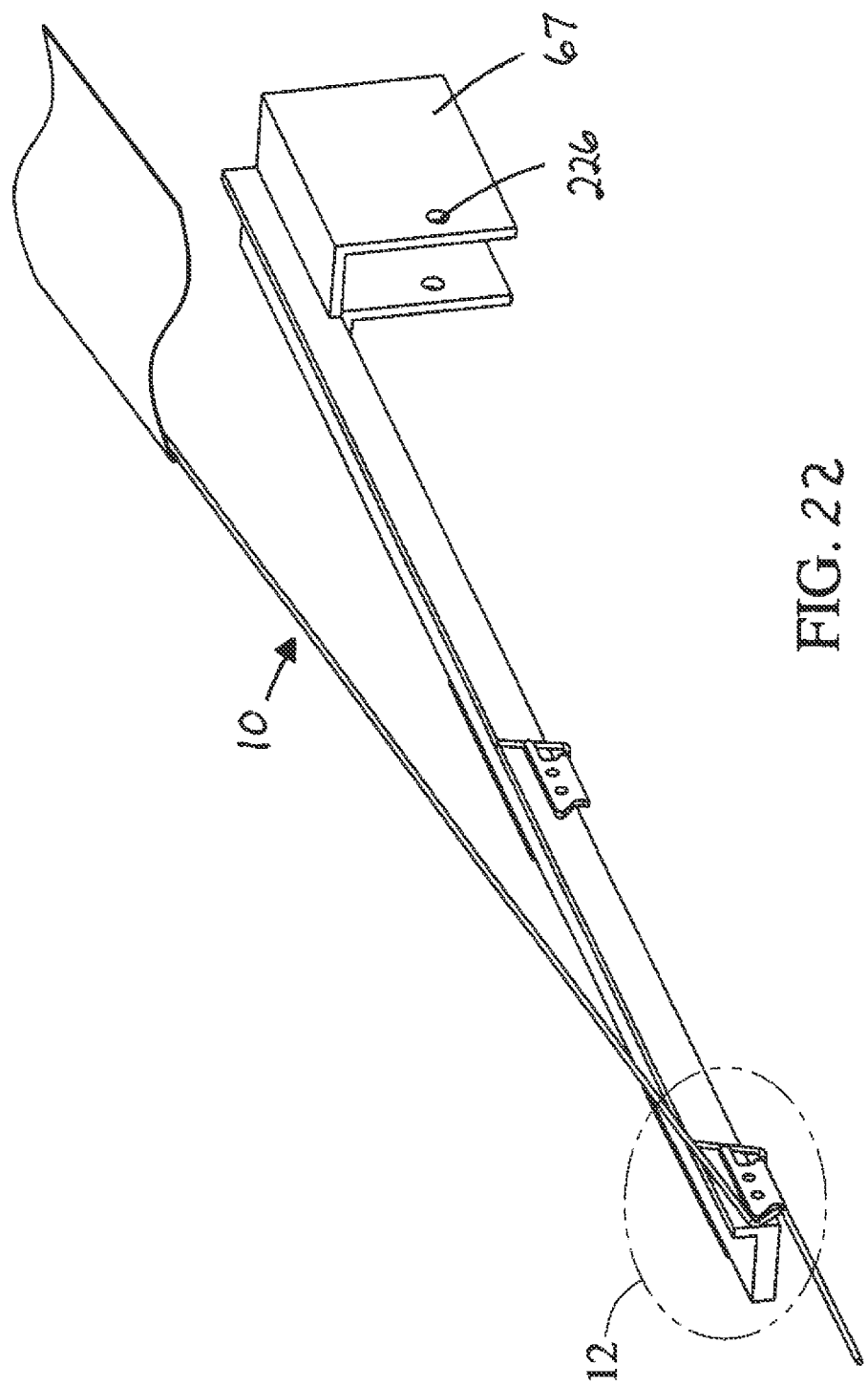
FIG. 22 is a schematic perspective view of the push member and it's relation to the flag of the marker insertion apparatus, according to an embodiment.
Figure 23:
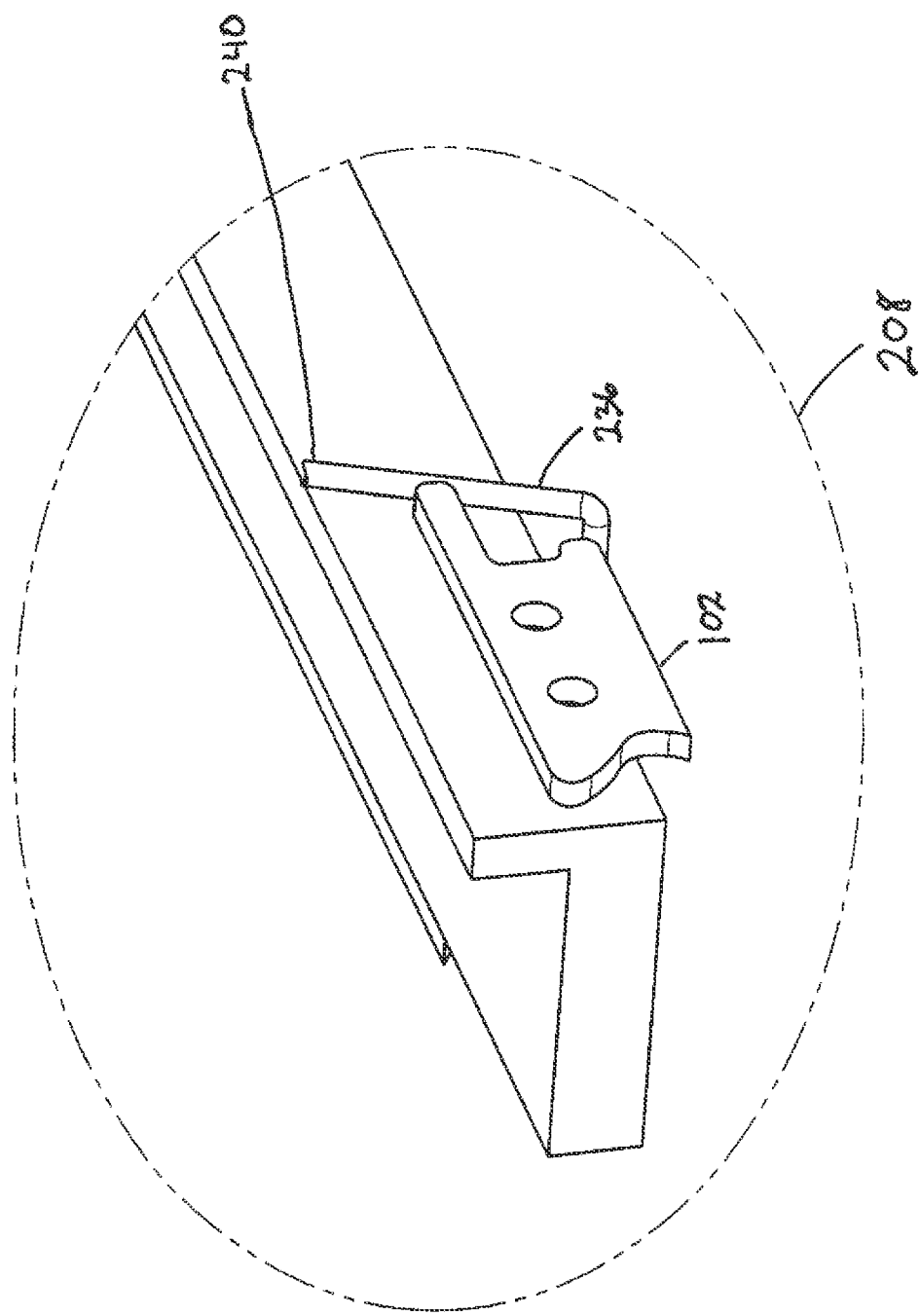
FIG. 23 is a schematic top view of a movable pivot portion of the marker installation assembly designed to prevent the penultimate flag from jamming the apparatus as the following flag is inserted into the surface of the ground, according to an embodiment.
Figure 24B:
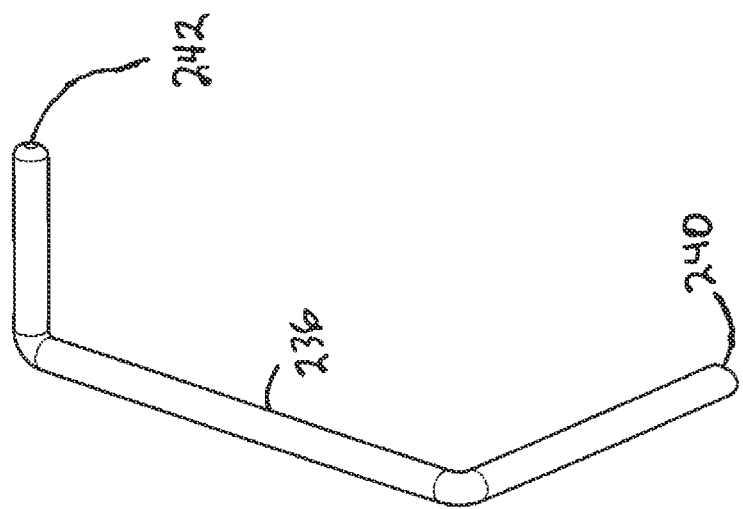
FIGS. 24A and 24B are schematic views of a movable pivot portion, according to an embodiment.
Figure 24A:
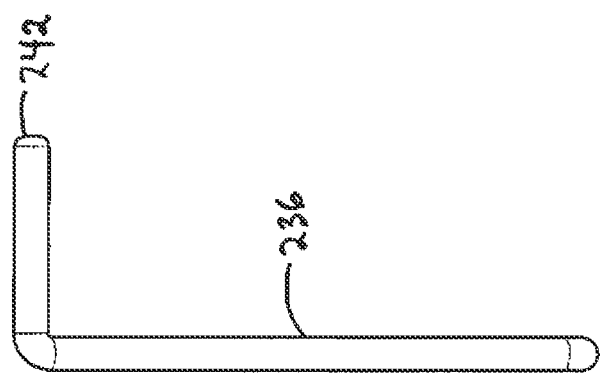
Figure 25B:
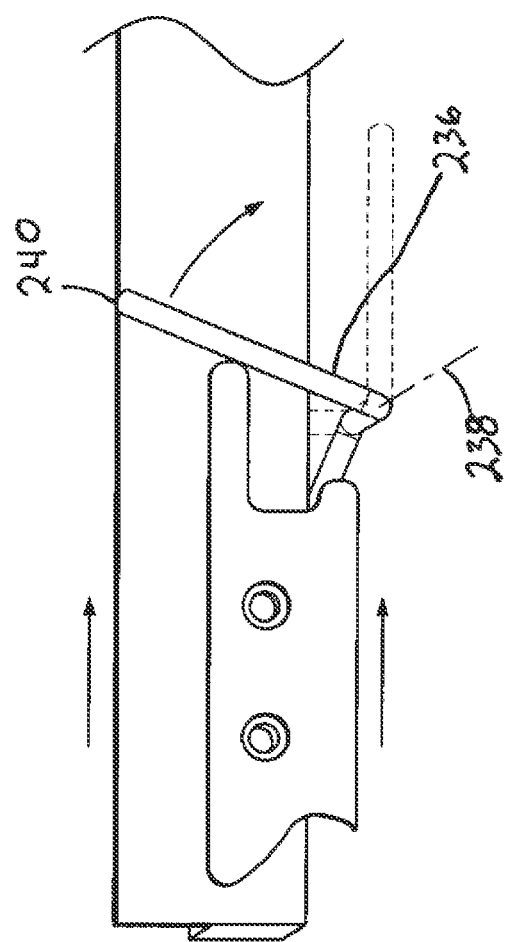

The paint stick 202 further includes a handle member 106 attached to a top end 14 of the nesting component, above the attachment portion 234. The handle member 106 is shaped to receive a human hand, and is in a plane substantially perpendicular to the plane of the magazine assembly 32 when the paint stick 202 is mounted to the push assembly 100 of the magazine assembly 32. As illustrated in FIGS. 21A through 21C, downward pressure on the handle member 106 of the paint stick 202—when the attachment portion 234 of the paint stick 202 is attached to the push assembly 100 of the magazine assembly 32—causes the push assembly 100 to push a marker 10 from the push position into a ground surface 4.

Figure 26:
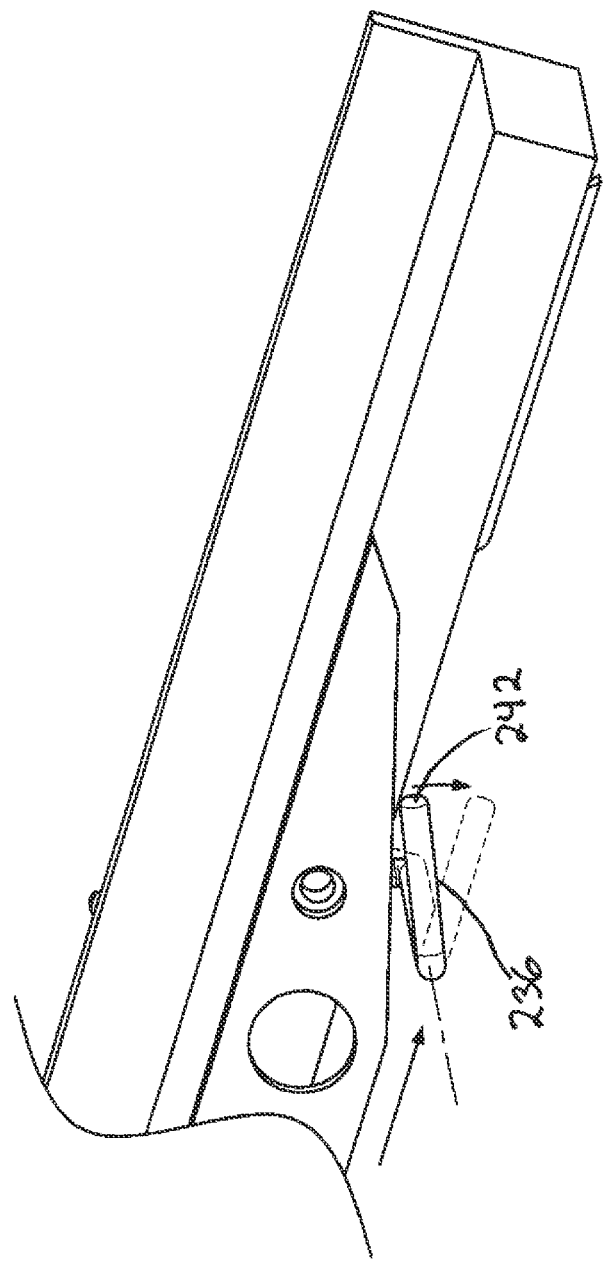
FIG. 26 is a schematic perspective view of a portion of the push assembly showing the push assembly moving in the direction of the push position, causing the movable pivot portion to pivot such that the part of the movable pivot portion on the flag facing side of the push assembly prevents the penultimate flag from interfering with the insertion of the preceding flag.
Figure 27A:
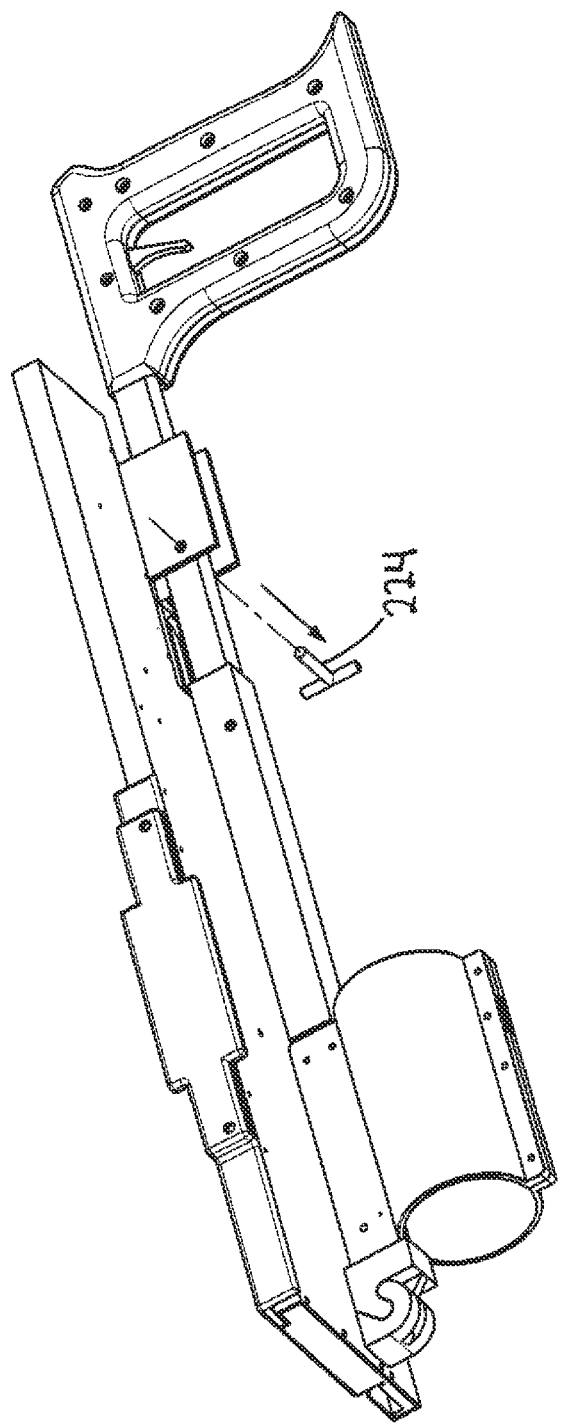
FIG. 27A through 27E are schematic perspective views of the paint stick being separated from the push assembly of the marker installation apparatus, so that the paint stick can be used independently, for example, to mark concrete surfaces.
Figure 27B:
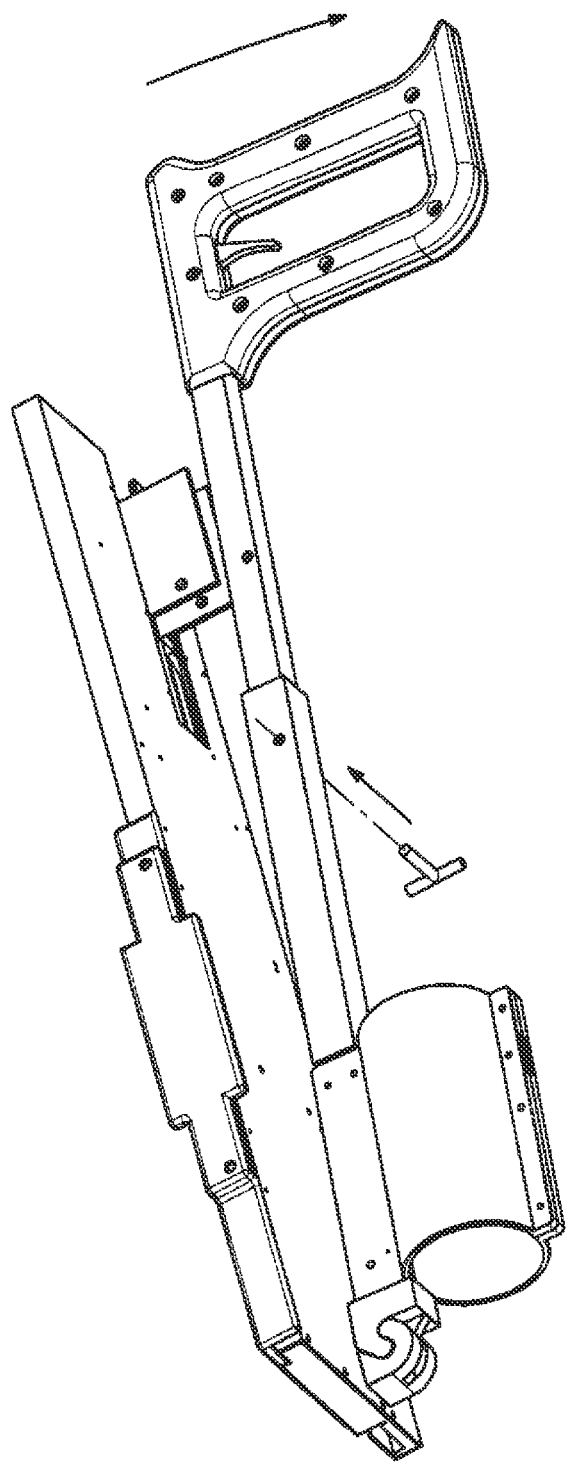
Figure 27C:
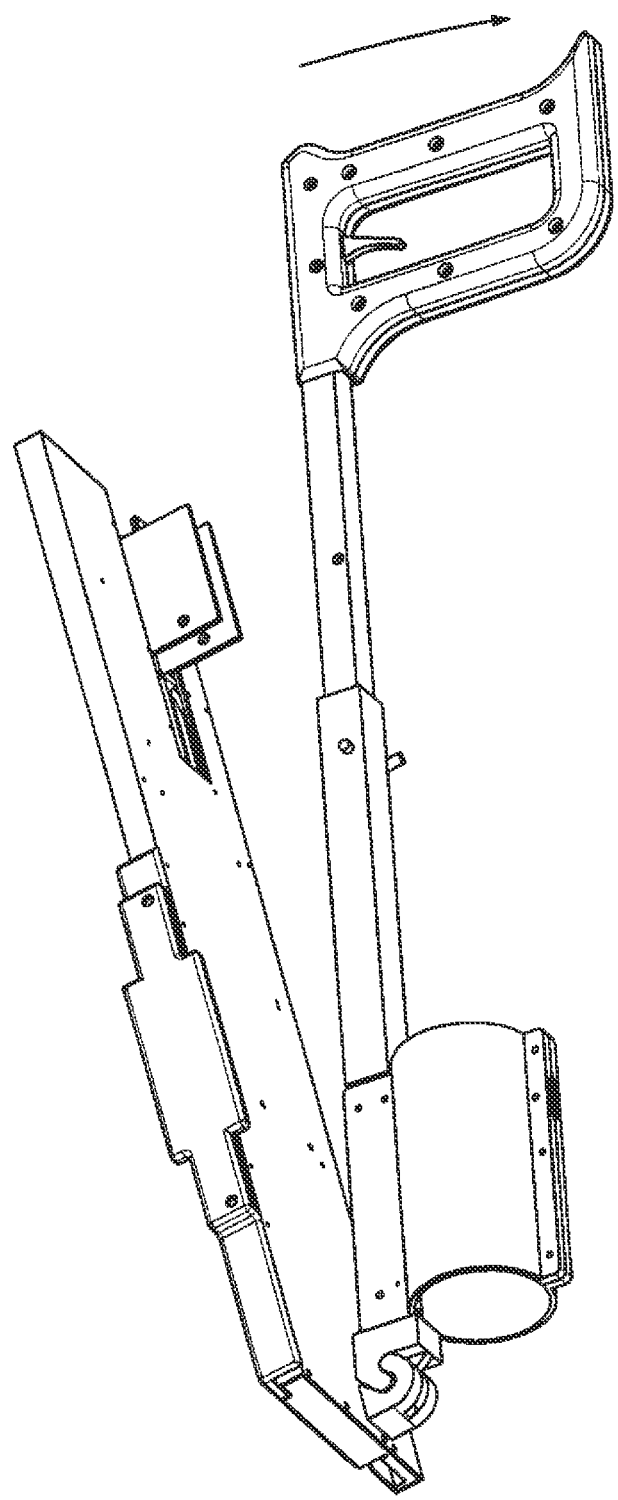
Figure 27D:
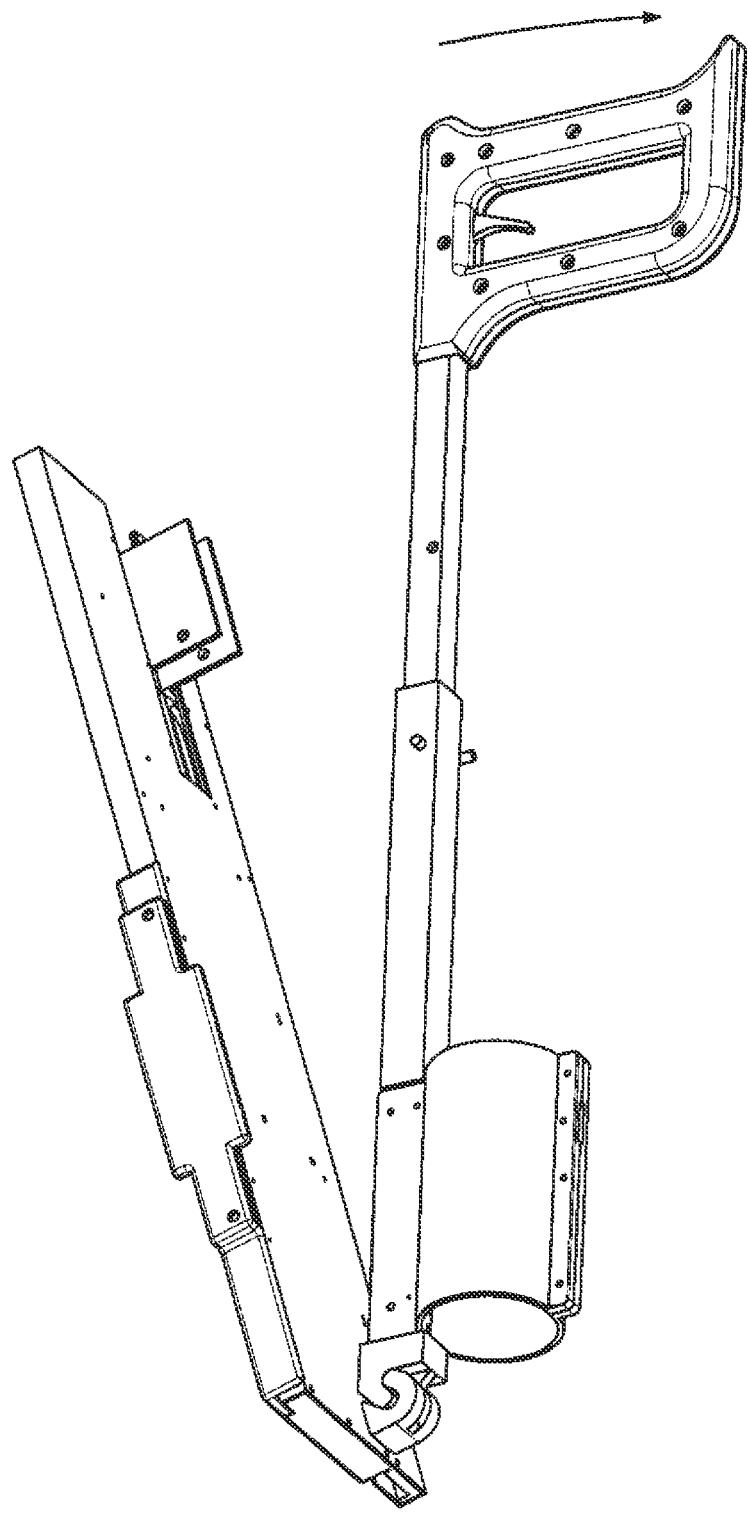
Figure 27E:
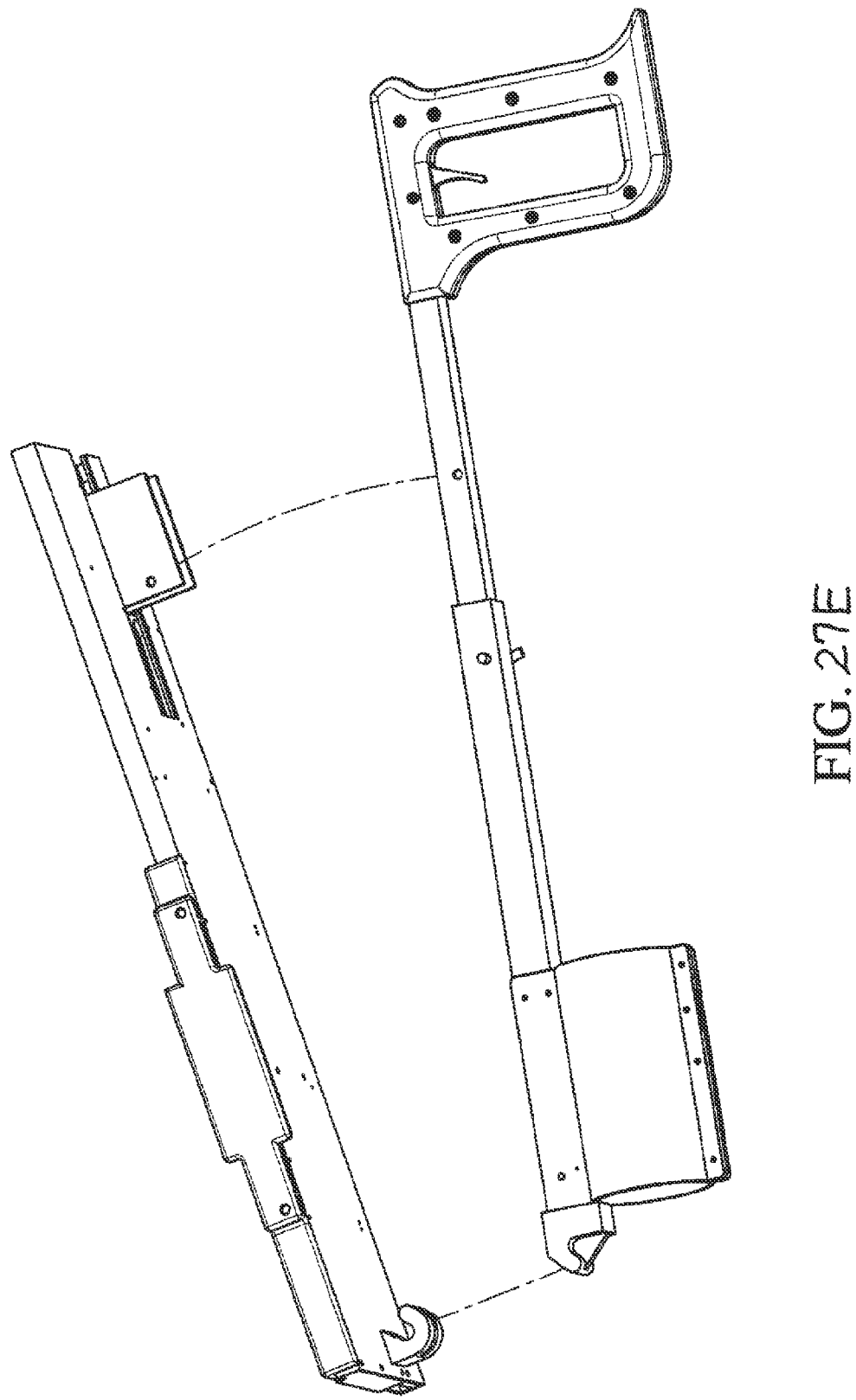
Figure 28:
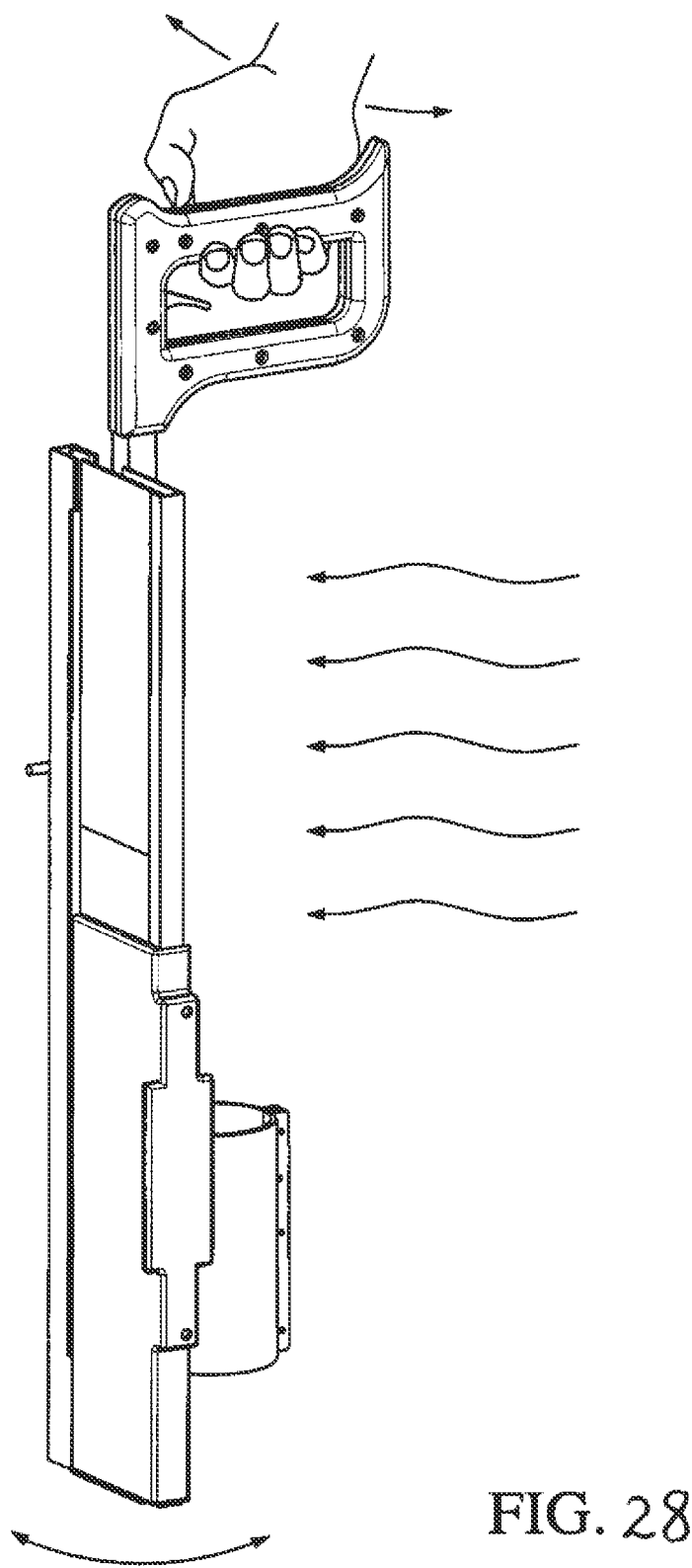
FIG. 28 is a schematic perspective view of an embodiment of an attachment installation apparatus in a windy environment, such that the apparatus is being stabilized by fore and aft motions of the operator's wrist.
Figure 29:
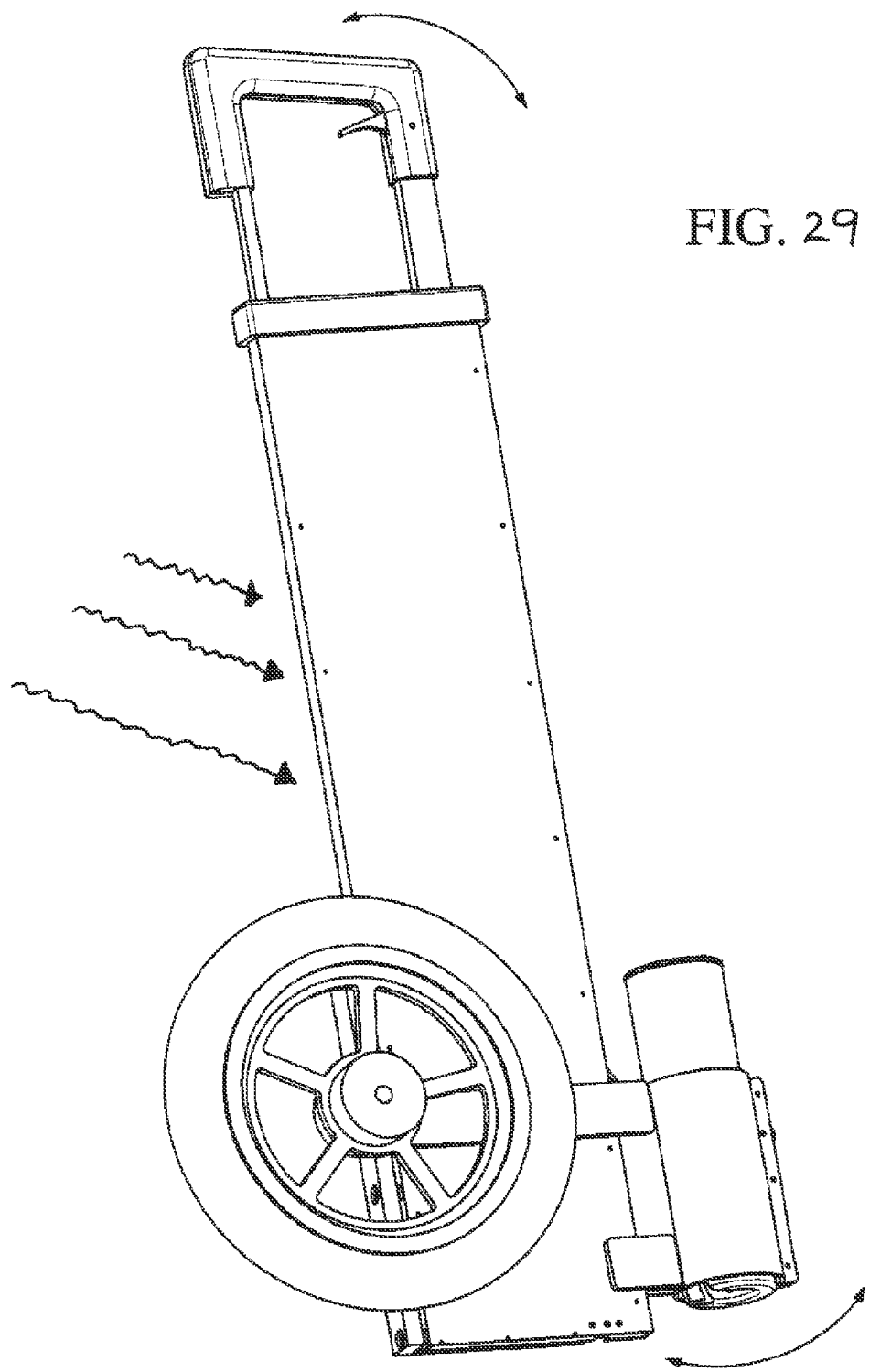
FIG. 29 is a schematic perspective view of an embodiment of an attachment installation apparatus in a windy environment, such that the apparatus would be pushed left and right by winds, and as a result being harder to control by an operator.
Figure 30A:
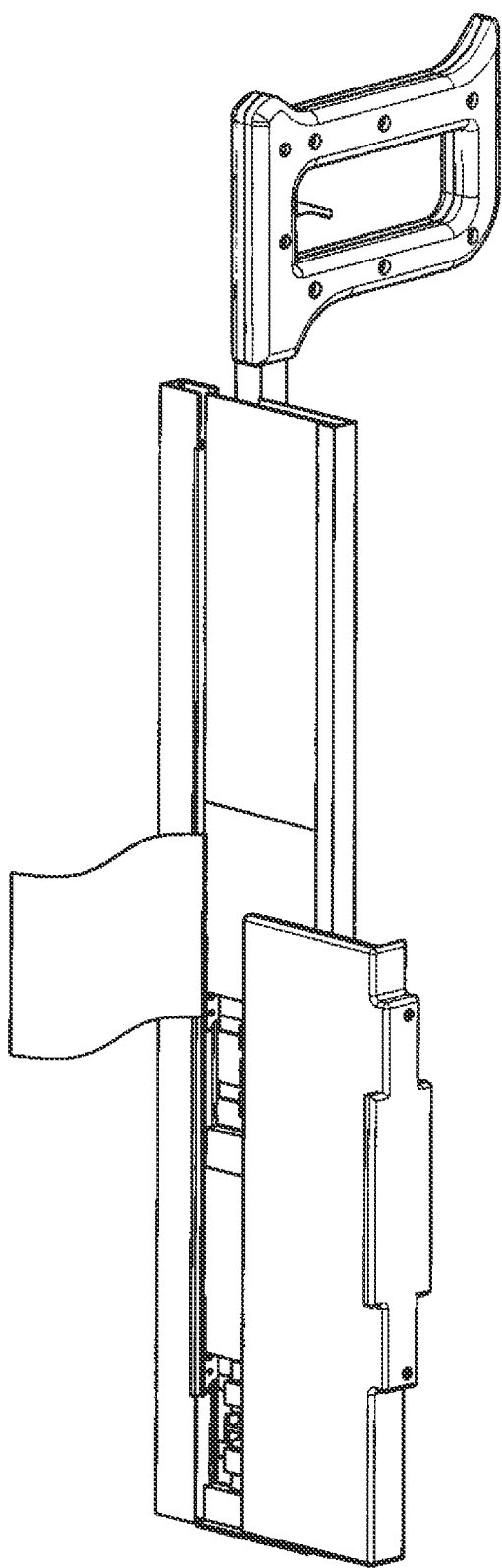
FIGS. 30A through 30C are schematic perspective views of a marker installation apparatus receiving for installation markers of varying lengths, from short to tall markers.
Figure 30B:
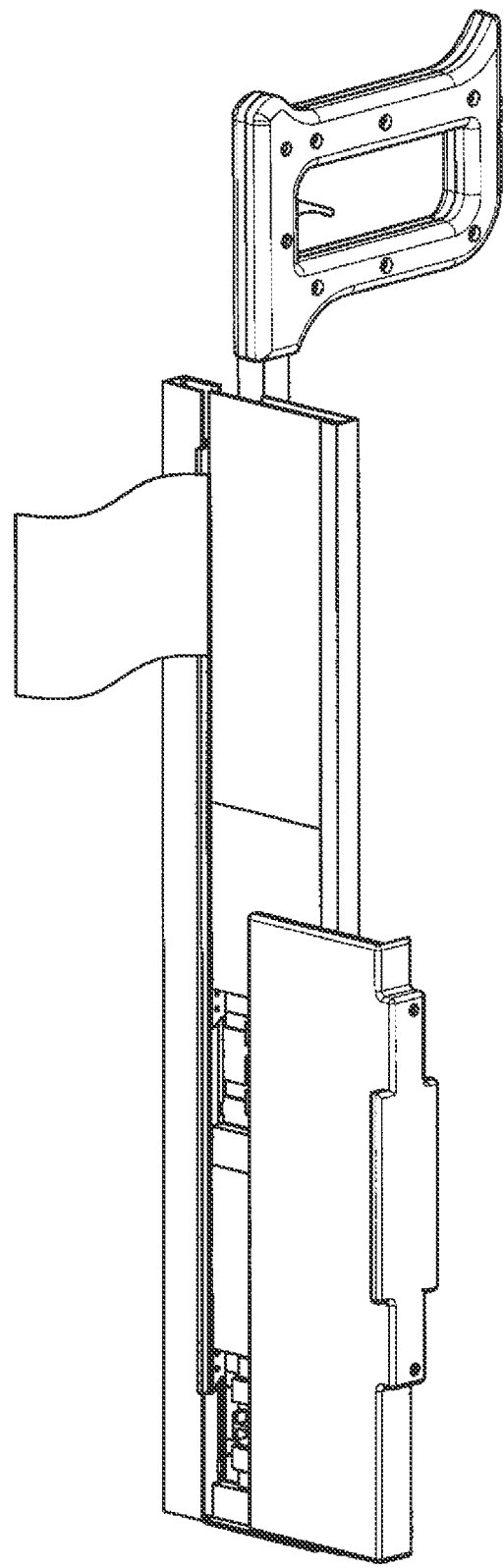
Figure 30C:
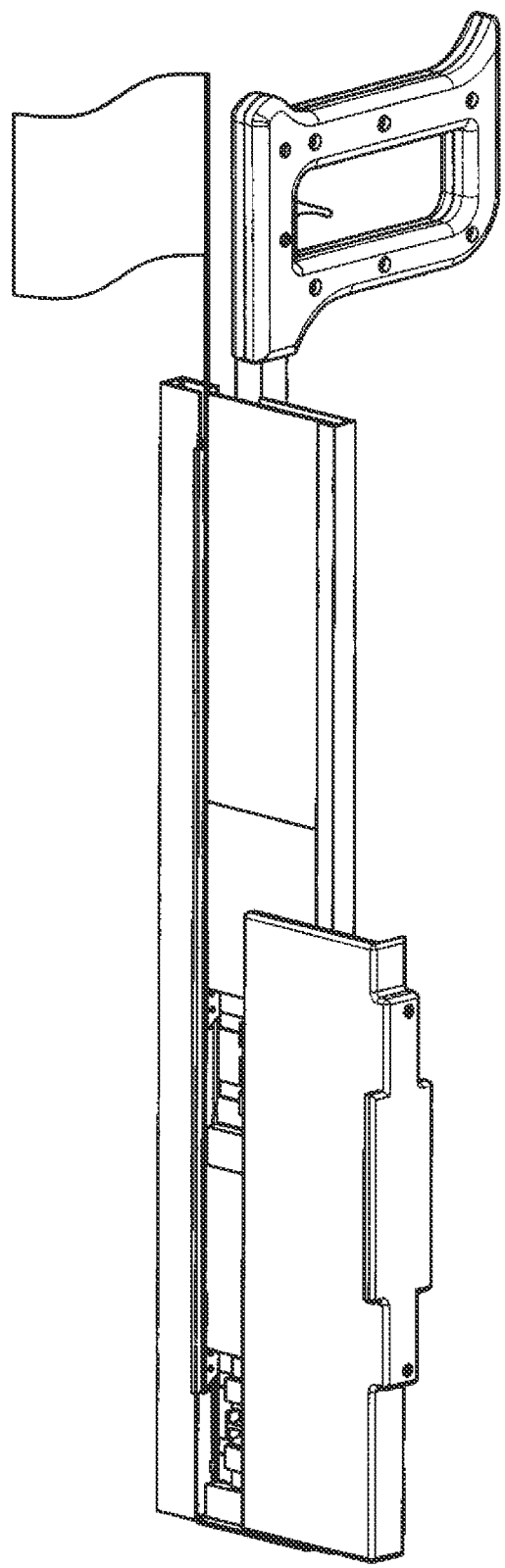

A flipper assembly 208 is incorporated into the magazine assembly 32 adjacent the push assembly 100, as shown in FIGS. 23 through 26. The flipper assembly 208 comprises a flipper 236 that pivots on an axis 238 of rotation, shown in FIG. 25B. As the push assembly 100 is advanced (e.g., when downward pressure is applied to the handle member 106), End B 240 of the flipper assembly 208 pivots clockwise, causing End A 242 of the flipper assembly 208 (e.g., shown in FIGS. 14a and 14b) to pivot counter-clockwise. As End A pivots counter clockwise, it lifts the shaft 12 of the marker 10 in the push position away from the plane of the magazine, so that friction from the remaining biased flags does not prevent insertion of the marker 10. Also, as End A pivots counter clockwise, the flipper assembly 208 holds back the remaining markers 10 to prevent jamming. Once the marker 10 in the push position is inserted fully into the ground surface 4, the push assembly 100 is retracted (e.g., moved upwards), causing End A of the flipper assembly 208 to rotate clockwise, as shown in FIG. 26. When End A of the flipper assembly 208 fully rotated so that it is parallel to the plane of the magazine assembly 32, the biased markers 10 advance so that another marker 10 is in the push position, ready for insertion with the marker installation apparatus 30.

Figure 34A:
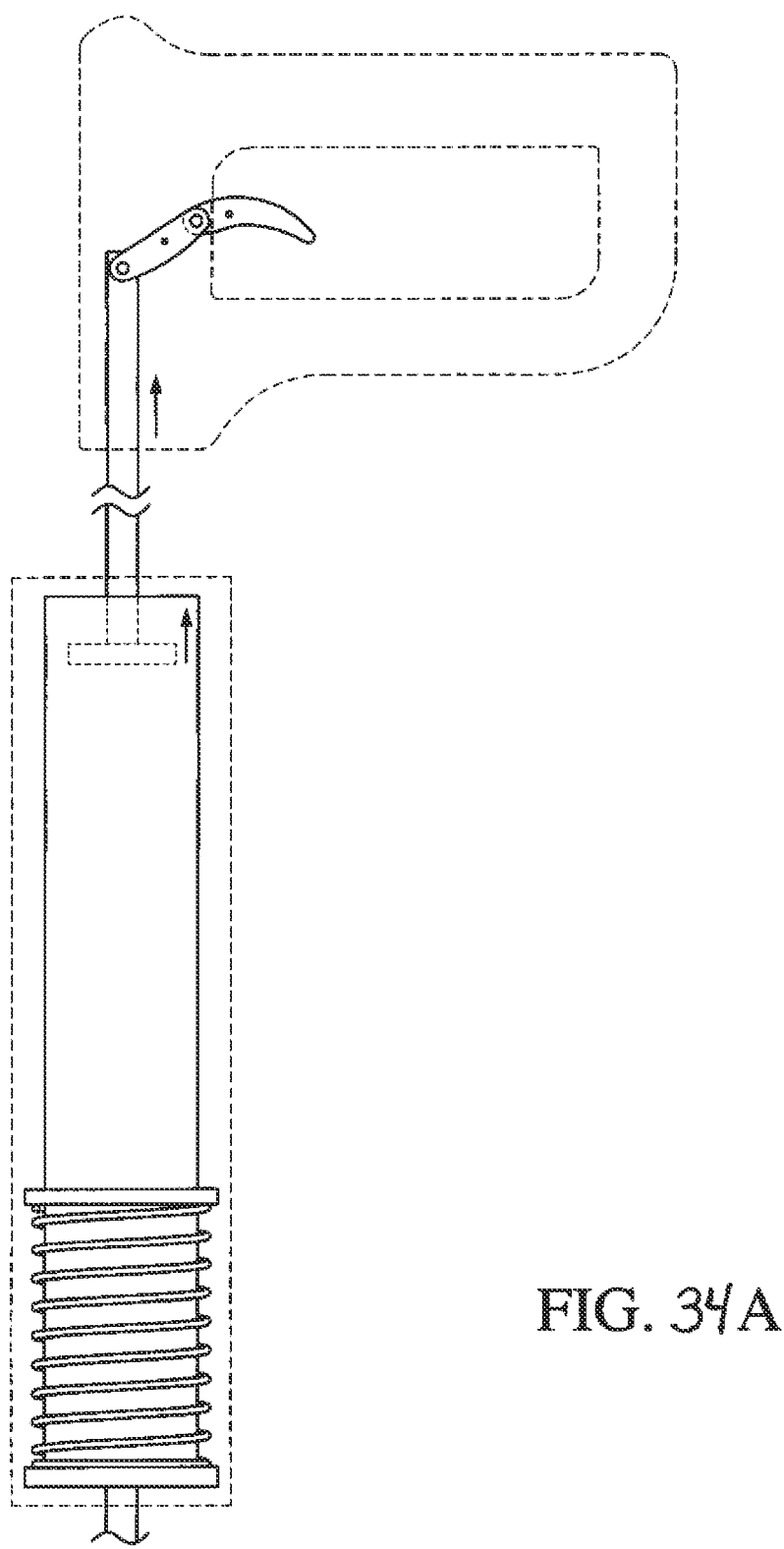
FIGS. 34A and 34B is a schematic side view of the trigger assembly for actuating a spray can located in the paint stick.
Figure 34B:
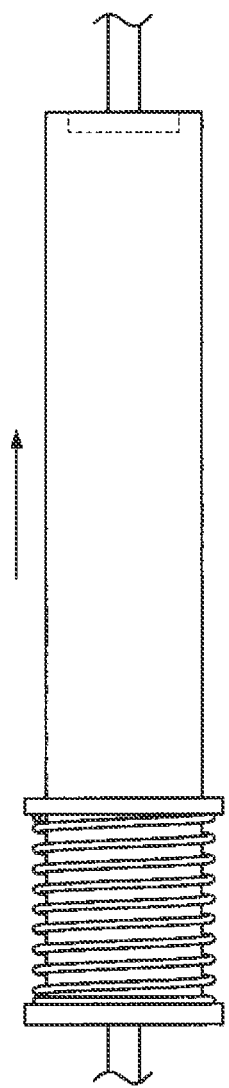

The handle member 106 of the paint stick 202 also includes a trigger 200, for triggering the spray of paint from a can located in a can holder 244 on the receiving portion 230 of the paint stick 202, located about the end of the paint stick 202 opposite the handle member 106. The trigger 200 and its operation are illustrated in FIGS. 34A and 34B. Although one mechanism is shown to allow the trigger 200 to actuate the spray can when the paint stick 202 is in its extended position, other mechanisms can be employed, such as a cable mechanism or any other mechanism capable of contracting with the paint stick 202 when the paint stick 202 is contracted to install a marker 10.

Figure 2:
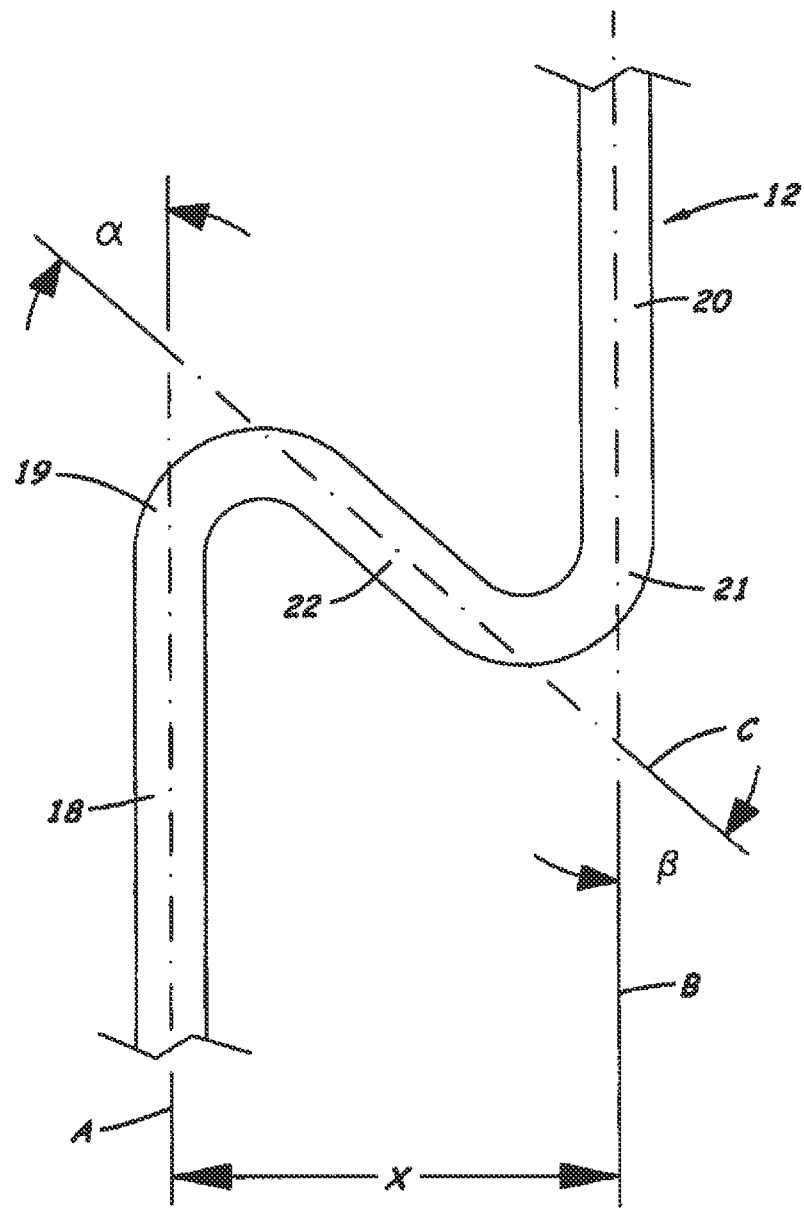
FIG. 2 is a schematic side view of a middle section of the marker, according to an illustrative embodiment.
Figure 3:
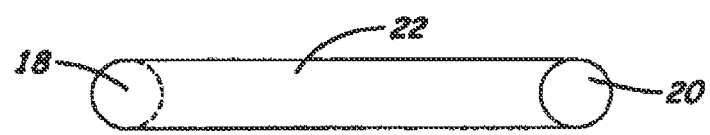
FIG. 3 is a schematic top end view of the marker, according to an illustrative embodiment.
Figure 17:
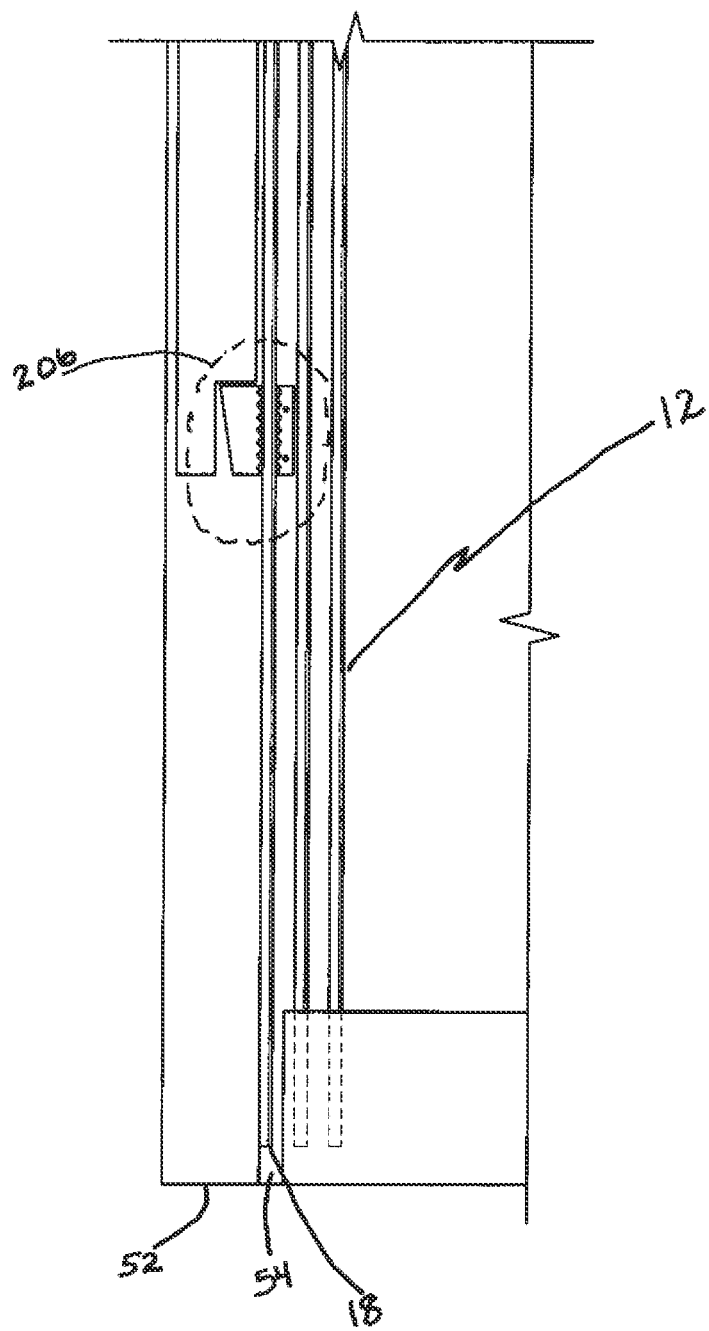
FIG. 17 illustrates a marker gripping apparatus in a marker engagement apparatus engaging a single marker out a plurality of markers, according to an embodiment.
Figure 18A:
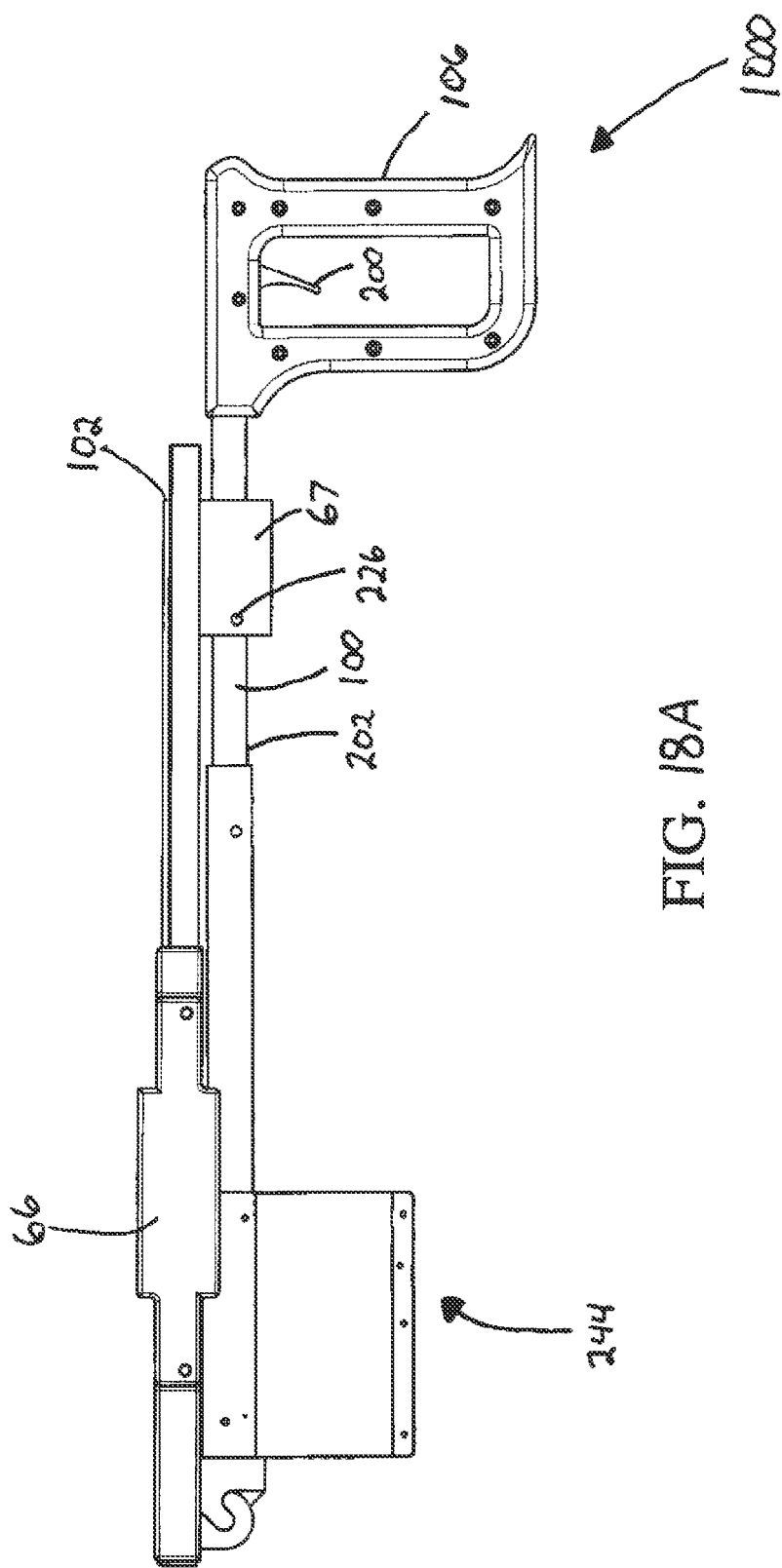
FIGS. 18A and 18B are schematic side views of a marker installation apparatus, according to an embodiment.
Figure 18B:
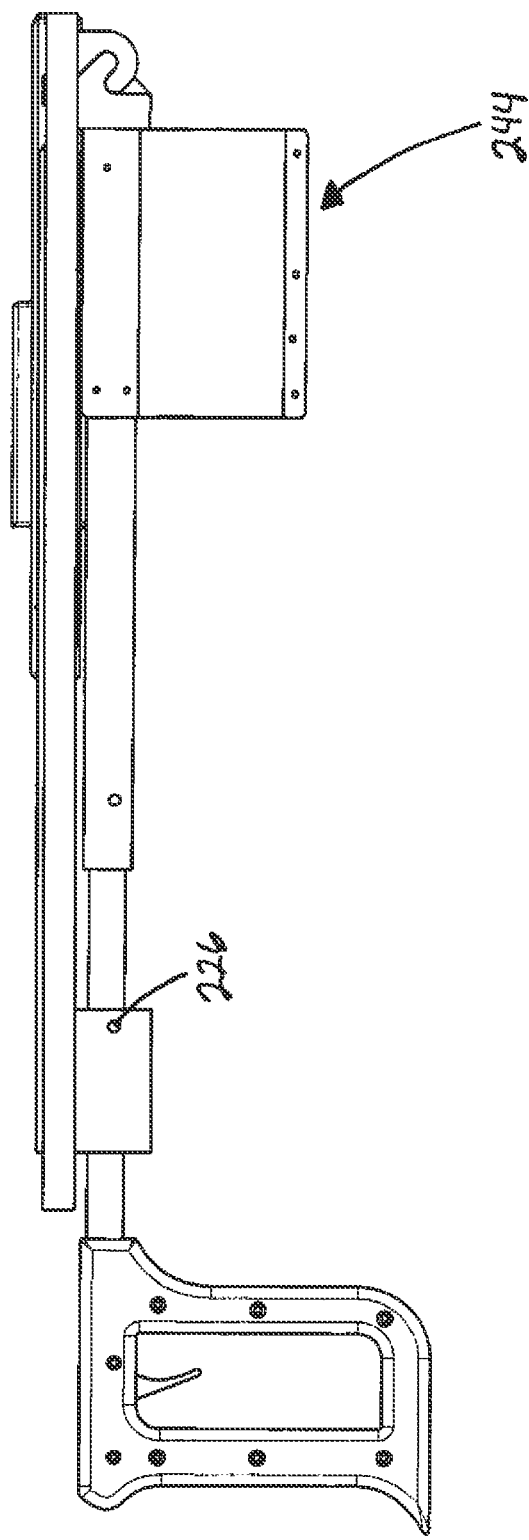
Figure 19:
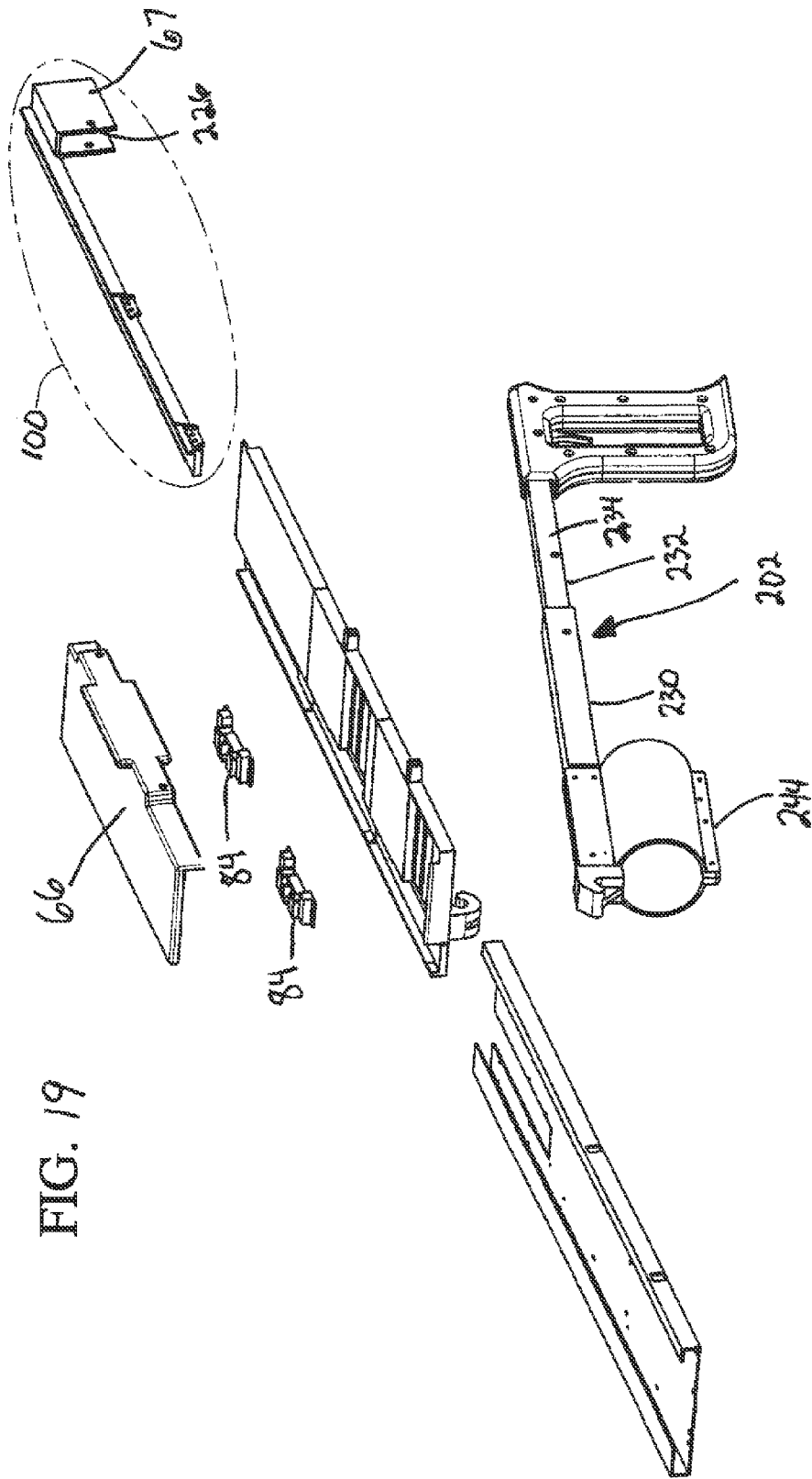
FIG. 19 is a schematic exploded perspective view of a marker installation apparatus, according to an embodiment, with the push member emphasized in the dashed oval.
Figure 20:
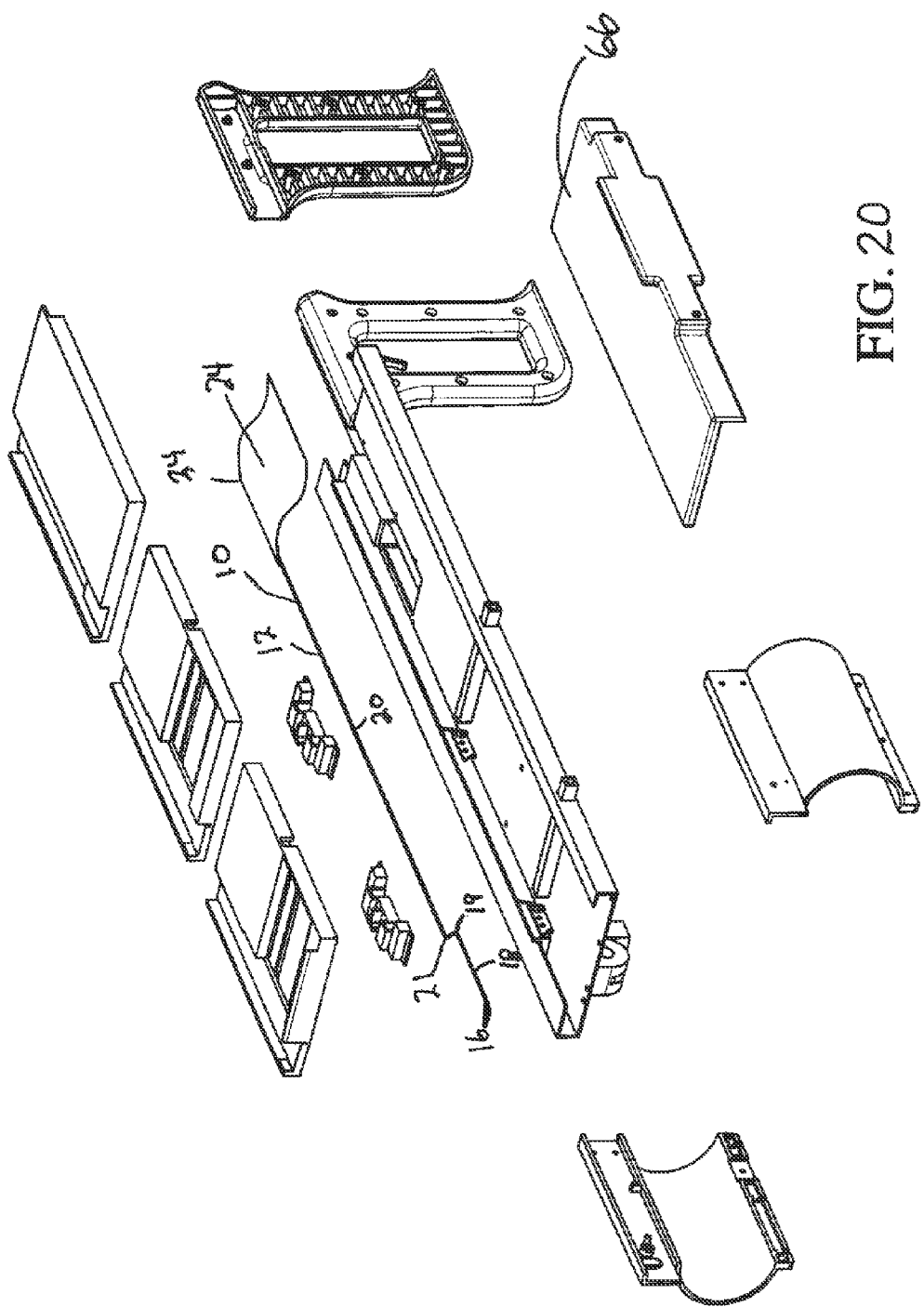
FIG. 20 is a schematic exploded perspective view of a marker installation apparatus, according to an embodiment, illustrative the relative position of the mark in relation to the other installation apparatus components.

With reference to FIGS. 15 through 17, illustrated is the marker gripping assembly 206 of a marker installation system 1000 to facilitate insertion of the marker 10 into a ground surface 4, according to an embodiment. In FIGS. 21A through 21C, the insertion portion 18 of the marker 10 is shown being inserted into the ground surface 4. A marker gripping assembly 206 grips a bend (e.g., engagement portion 22) in the shaft 12 of the marker 10 (e.g., a bend as shown in FIG. 2).

With reference to FIGS. 15 through 17, illustrated is the marker gripping assembly 206 of a marker installation apparatus 30 and method to facilitate insertion of the marker 10 into a ground surface 4, according to an embodiment. The insertion portion 18 of the marker 10 is shown inserted into the ground surface 4. A marker gripping assembly 206 (i.e. "Marker Gripping Apparatus") is shown gripping the shaft 12 of the marker 10. The gripping assembly 206 includes a fixed grip portion 210 and a movable grip portion 212. The fixed grip portion 210 includes a plurality of teeth 214 for gripping a marker 10 when the marker 10 is pressed against the teeth. The fixed portion 210 is attached to the push assembly 100 adjacent the push position, such that the shaft 12 of a marker 10 in the push position abuts the teeth 214 of the fixed grip portion 210. The movable grip portion 212 is pivotally attached to the push assembly 100 by a pivoting attachment point 216, opposite of the fixed grip portion 106. The movable grip portion 212 includes a plurality of teeth 218 and can be configured to apply substantially horizontal force to the marker 10 in the direction of the fixed portion, causing the marker 10 to be pressed between the teeth 214 of the fixed portion 210 and the teeth 218 of the movable portion 212. The movable grip portion 212 pivots between a non-gripping position and a shaft gripping position (e.g., as shown in FIG. 16).

According to an embodiment as shown in FIGS. 15 and 16, in addition to pivoting relative to the pivoting attachment point 216 on the push assembly 100, the pivoting attachment point 216 can be manipulated within a channel 220 (e.g., a vertical channel) located in the magazine assembly 32. A cable or other actuating device (not shown) is attached to the pivoting attachment point 216 in order to slide the point 216 within the channel 220. When the pivoting attachment point 216 is positioned in a lower part of the channel 220, the movable grip portion 212 pivots downwardly into a non-gripping position, so that a marker 10 can be loaded into push position of the apparatus 30 (or advanced into the push position, in the case of biased markers 10 loaded in the magazine). When the pivoting attachment point 216 is moved to the upper part of the channel 220, the movable grip portion 212 is urged toward the fixed portion 210, so that at least some of the teeth 218 of the movable grip portion 212 engage the shaft 12 of the marker 10 in the push position. As downward force is applied by the push assembly 100 of the apparatus 30, the movable grip portion 212 pivots upwardly, toward the fixed portion 210, causing the shaft 12 to be pressed towards the fixed portion 210, gripping the shaft 12 between the movable grip portion 212 and the fixed grip portion 210. When the movable portion 212 has fully engaged the shaft 12, push assembly 100 continues to apply downward force to the marker 10, inserting the marker 10 into the ground surface 4.

According to an embodiment, when upward force is applied to the marker gripping assembly 206 by the push assembly 100, the movable portion 212 pivots downwardly to release a gripped marker 10 in its installed position. A cross-sectional view of the gripping assembly 206 is shown in FIG. 16 (i.e. Marker Gripping Apparatus Cross-Sectional View), illustrating the position of the movable portion 212 when the gripping assembly 206 is configured to grip a marker 10.

According to an embodiment, multiple markers 10 can be loaded into a magazine assembly 32 of the marker installation apparatus 30, enabling the storage and use of multiple markers 10 within a single marker 10 installation apparatus 30. A biasing assembly 80 of the marker installation apparatus 30 can be used to bias the multiple markers 10 toward the push position, such that a marker 10 is advanced to the push position after the previous marker 10 is inserted into the ground surface 4.

According to an embodiment, multiple markers 10 can be linked or collated together to facilitate handling and insertion of the collated markers 25 into the magazine assembly 32. The markers 10 may be collated together on an outside surface of the marker 10 or the attachment 222 by an elongated element. As shown in FIG. 5, Numeral 23, the elongated element (e.g., tape, glue, integrally molded tearable strip) extends across multiple markers 10 such that the elongated element is substantially positioned perpendicularly to any one of the multiple markers 10. According to an embodiment, an adhesive may bond a portion of the shafts of adjacent markers 10 in the collated markers 25 together, and an adhesive would not prevent dislodgment of one marker 10 from the other markers 10 when force is applied to the one marker 10 in a direct parallel to the longitudinal axis of the marker 10. The markers 10 may be secured together in a planar arrangement that locates markers 10 on opposite sides of a marker 10 in the line of markers 10.

Figure 31A:
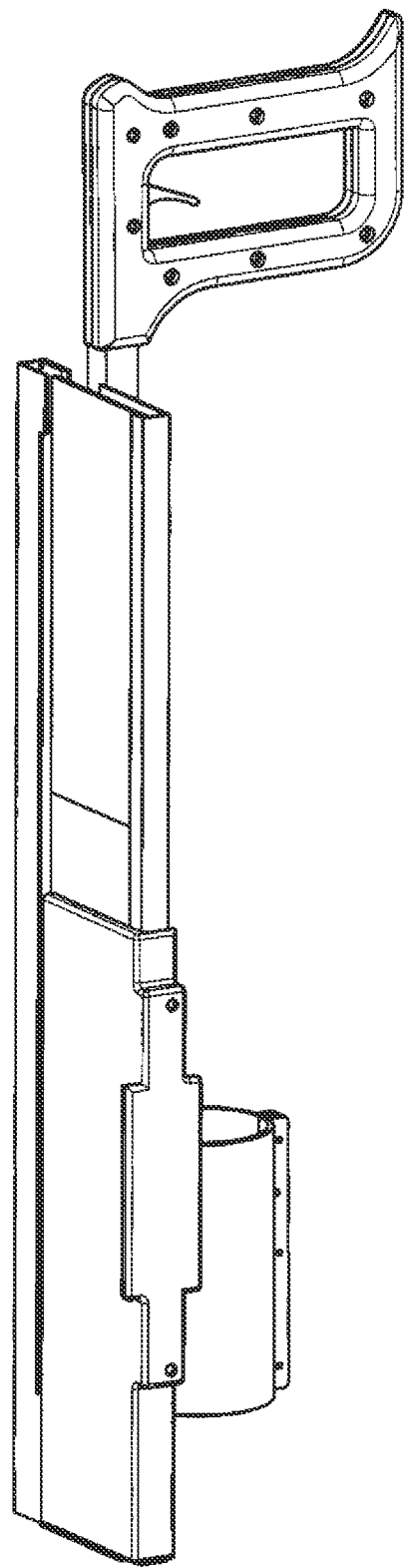
FIGS. 31A through 31D are schematic perspective views of the marker installation apparatus receiving a plurality of markers in a collated configuration by opening the cover, thereby causing the slider members and the biasing assembly to move and allow the markers to be inserted.
Figure 31B:
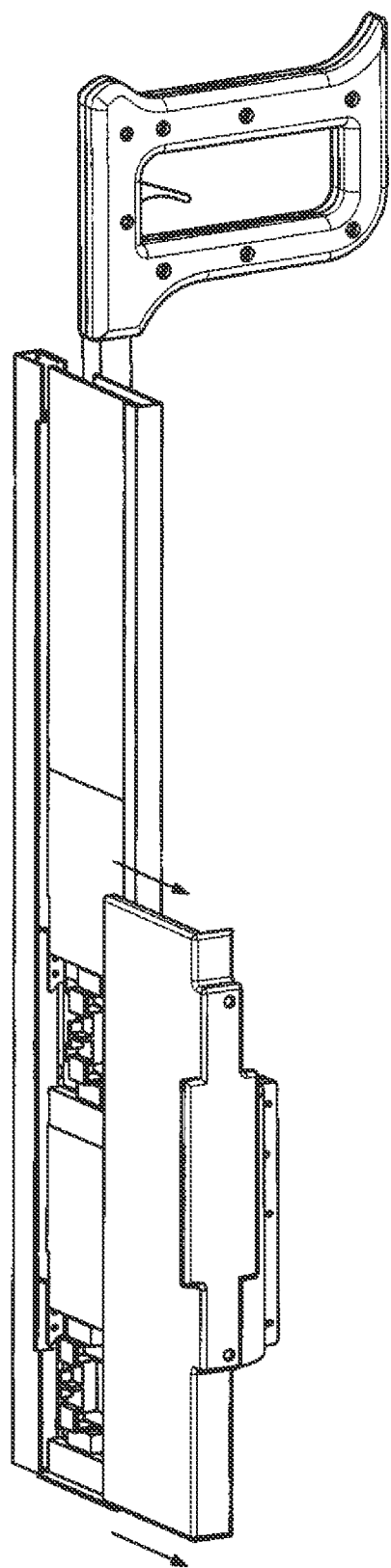
Figure 31C:
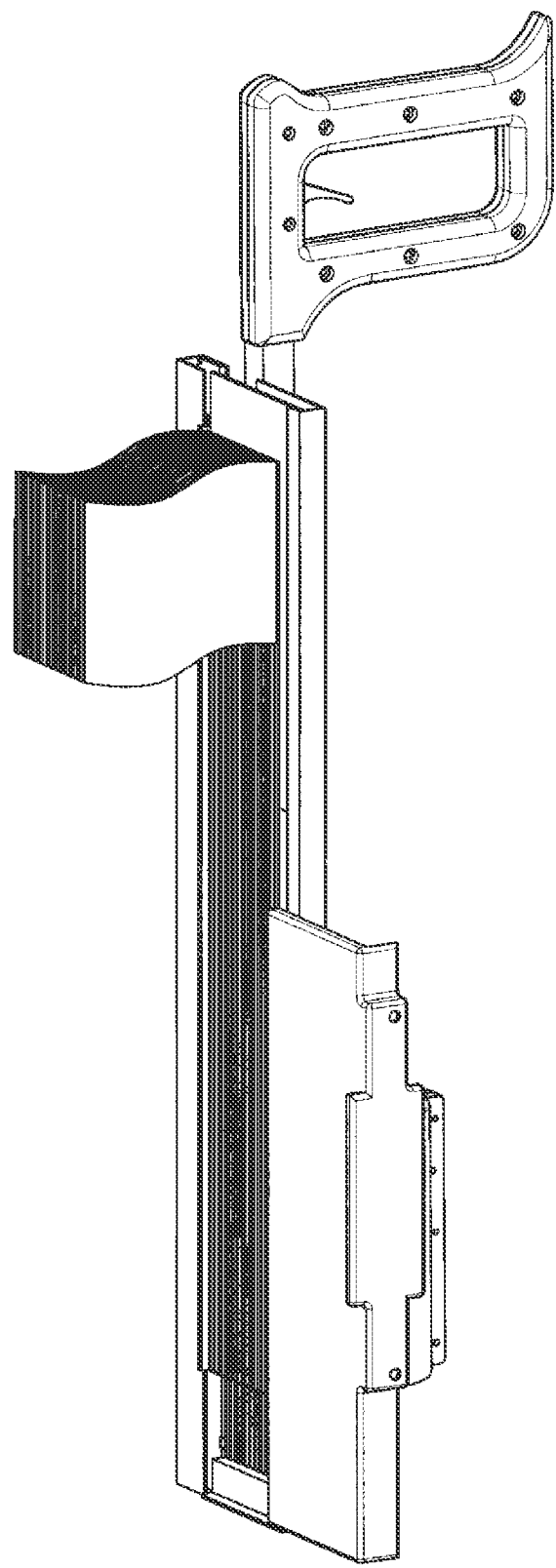
Figure 31D:
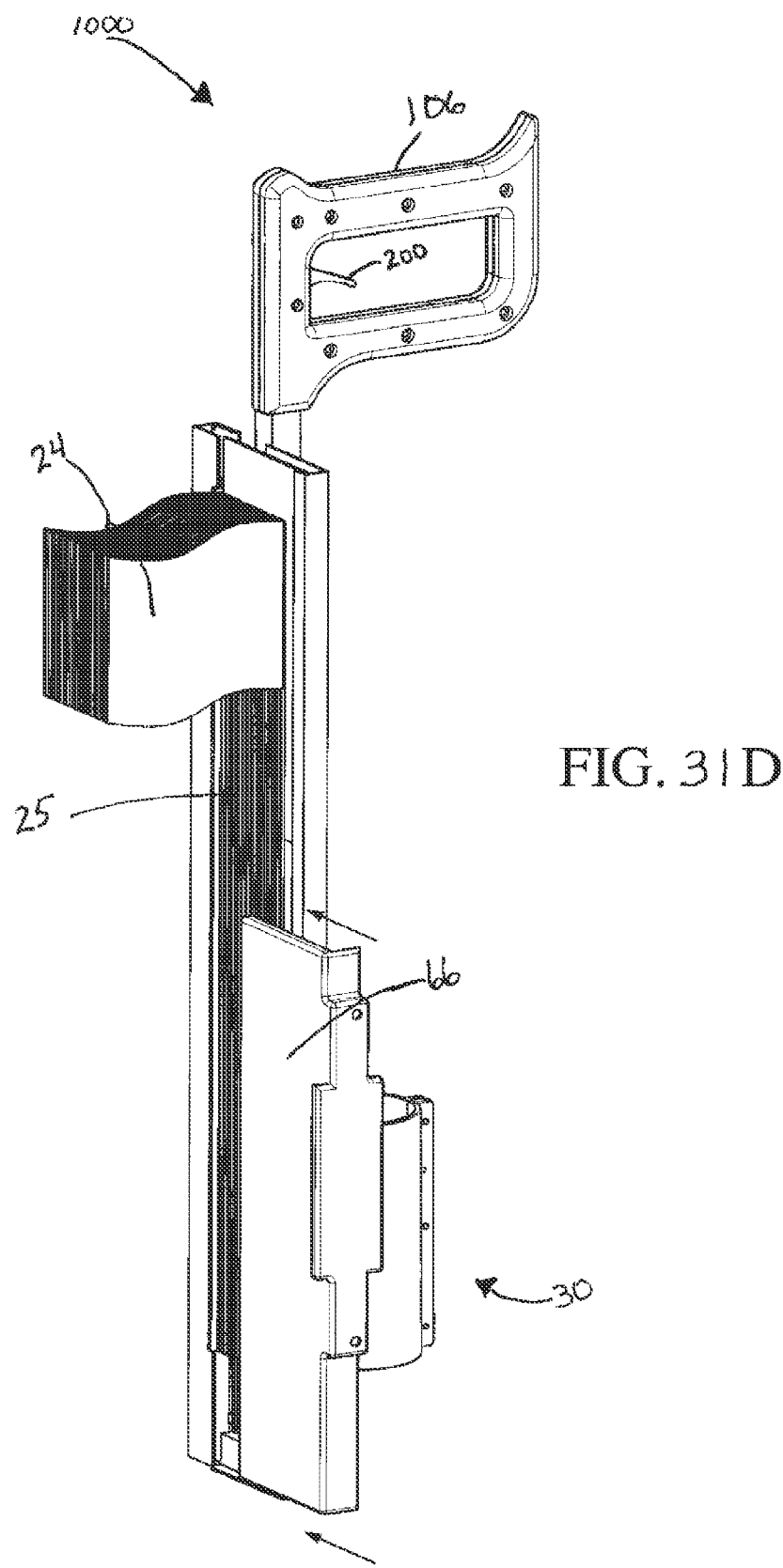
Figure 32:
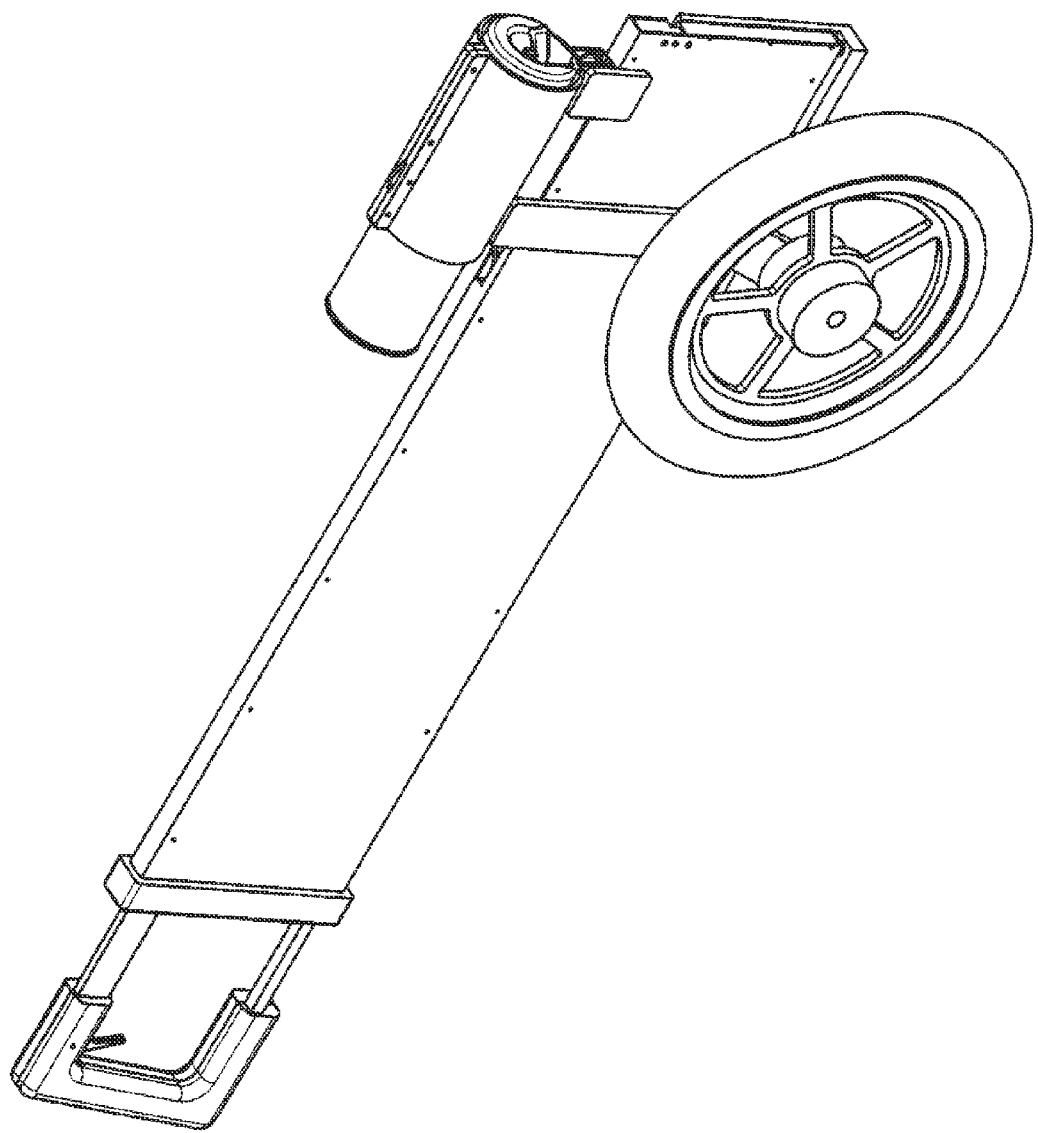
FIGS. 32A and 32B are schematic front and rear perspective views of a marker installation apparatus, according to an embodiment.
Figure 32B:
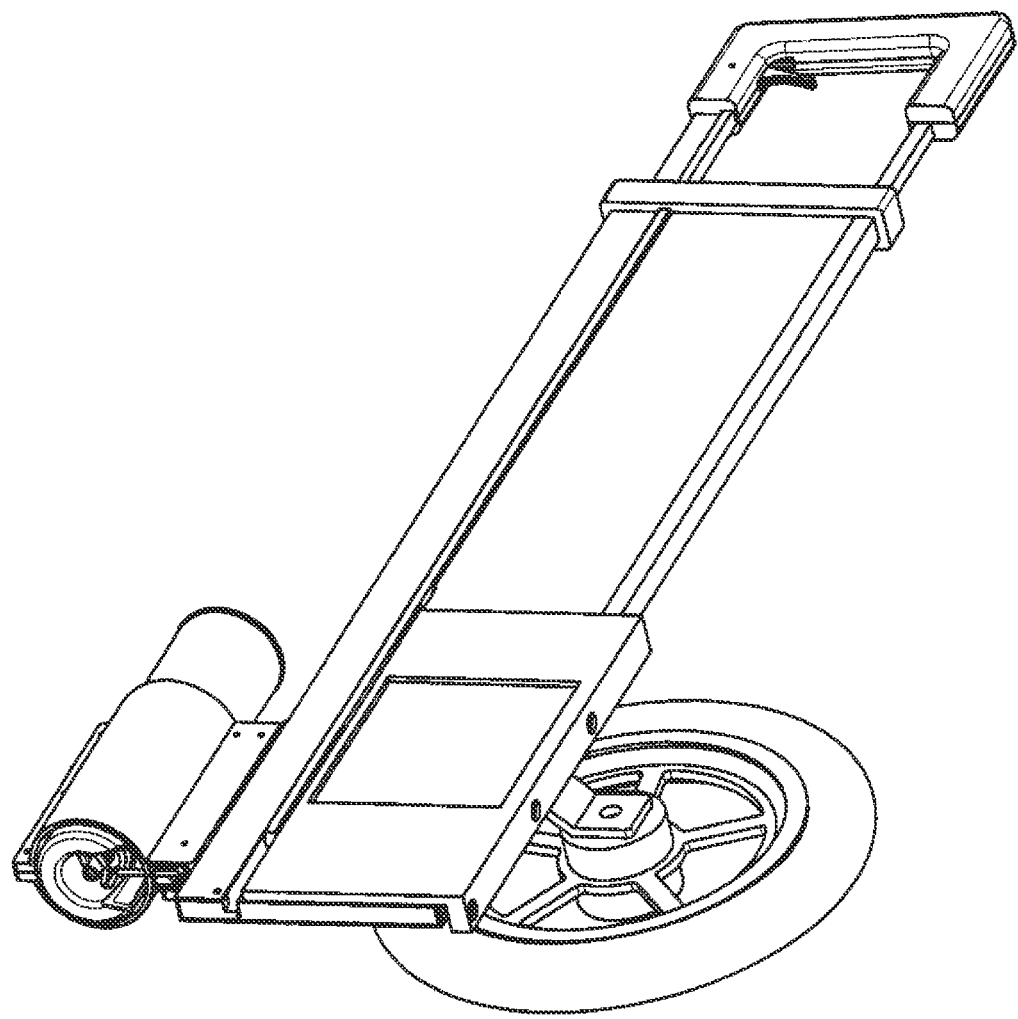
Figure 33:
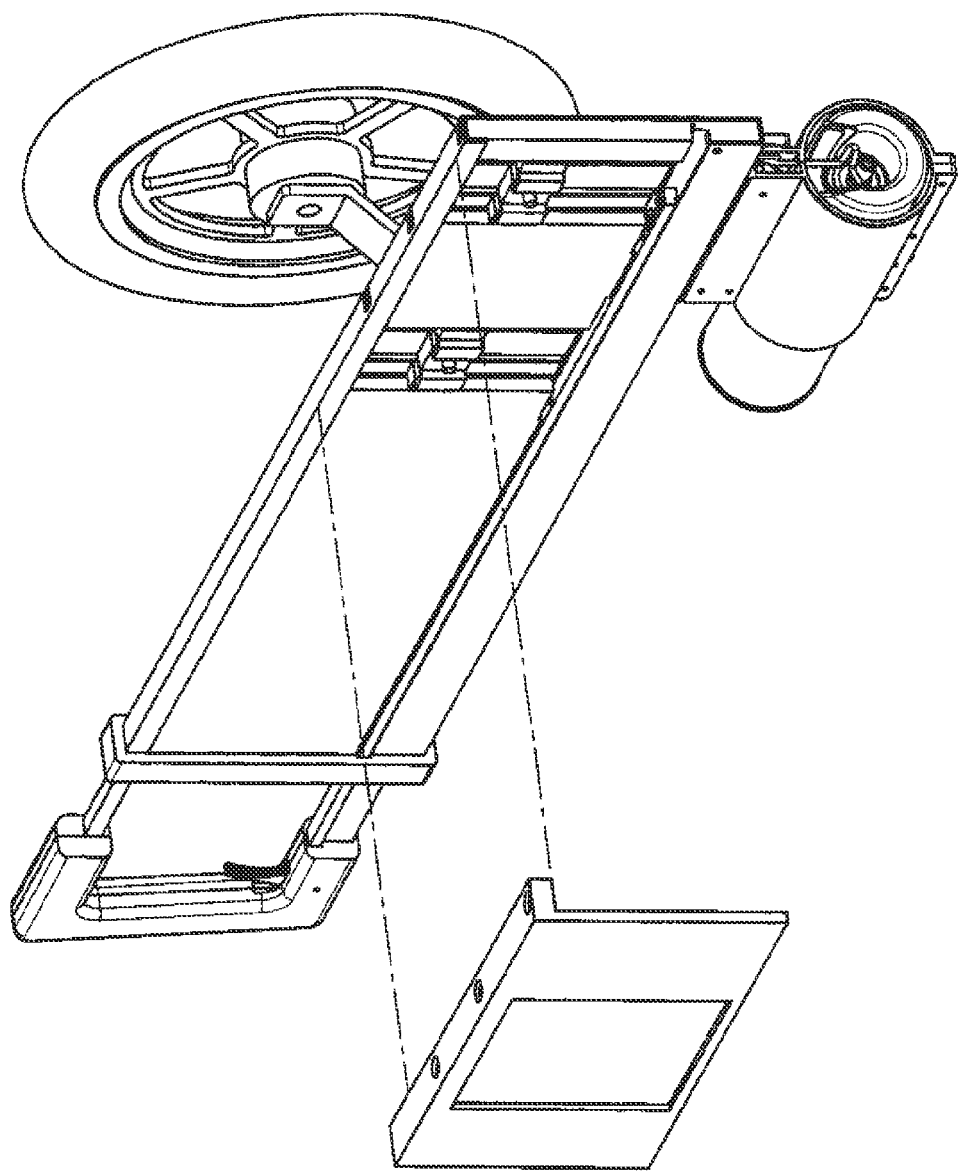
FIG. 33 is a schematic perspective view of the marker installation apparatus with the cover exploded away from the apparatus.

FIG. 31D illustrates an embodiment in which the apparatus 30 is loaded with markers 10 that are linked or collated together (collated markers 25). Collation facilitates handling and loading of collated markers 25 into a marker installation apparatus 30 having a magazine assembly 32.

The word "exemplary" is used herein to mean serving as an example, instance, or illustration. For the avoidance of doubt, the subject matter disclosed herein is not limited by such examples. In addition, any embodiment or design described herein as "exemplary" is not necessarily to be construed as preferred or advantageous over other embodiments or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

In view of the exemplary system 1000 and methods described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Embodiments of the system 1000 of the disclosure are disclosed in the description and related drawings directed to specific embodiments of the disclosure. Alternate embodiments may be devised without departing from the scope of the disclosure. Additionally, well known elements of the system 1000 of the disclosure will not be described in detail or will be omitted so as not to obscure the relevant details of the disclosure.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Moreover, in the foregoing Detailed Description, it can be seen that various features are described in the context of a single embodiment for the purpose of streamlining the disclosure. The disclosure of a single embodiment is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Further, where the term "substantially" is used, it is intended to mean "for the most part" or "being largely but not wholly that which is specified".

What is claimed is:

1. A system for use with a marker and a marker insertion apparatus in marking a ground surface, comprising:
   the marker comprising: a shaft, the shaft having a bottom end and a top end, the shaft including: an insertion portion for insertion into the ground, the insertion portion being located at the bottom end of the shaft;
   a mast portion for extending above the ground surface when the insertion portion is at least partially inserted into the ground; and
   an engagement portion located between the insertion portion and the mast portion with the insertion portion being located between the engagement portion and the bottom end, the engagement portion being configured to be engaged and pushed by the marker insertion apparatus to cause insertion of the bottom end of the shaft into the ground;
   and the marker insertion apparatus comprising: a magazine assembly defining a magazine space configured to receive at least one marker, the magazine space having a push position in the magazine space for receiving the at least one marker and a push assembly mounted on the magazine assembly, the push assembly comprising a flipper assembly configured to lift one marker away from the magazine assembly when the push assembly is actuated such that the push assembly engages the engagement portion of the shaft of the marker located in the push position and pushes the marker from the magazine assembly when the push assembly is actuated.

2. The system of claim 1 wherein a plurality of the markers are bonded together such that each of the markers can be removed from the rest of the plurality when it is desired to insert the marker into the ground.

3. The system of claim 1 wherein the magazine assembly includes a base member defining a shoulder configured to abut against the engagement portion of markers when the markers are positioned in the magazine space.

4. The system of claim 1 wherein an axis along which the mast portion extends is substantially parallel to an axis along which the insertion portion extends; and wherein the axis along which the mast portion extends is offset from the axis along which the insertion portion extends.

5. The system of claim 1 additionally comprising a visual indicator mounted on the shaft.

6. The system of claim 5 wherein the visual indicator comprises a flag mounted on the mast portion of the shaft.

7. The system of claim 1 wherein an axis of the engagement portion is oriented at a non-zero angle to an axis of the insertion portion.

8. The system of claim 1 wherein an axis of the engagement portion is oriented at a non-zero angle to an axis of the mast portion.

9. The system of claim 1 wherein an angle between an axis of the engagement portion and an axis of the insertion portion is substantially equal to an angle between the axis of the engagement portion and an angle of the mast portion.

10. The system of claim 1 wherein the insertion portion, the mast portion, and the engagement portion lie in a common plane.

11. The system of claim 1 wherein the insertion portion is substantially linear along an axis.

12. The system of claim 1 wherein the push assembly comprises a push member being mounted on the base member, the push member being movably mounted in a barrel bore of the base member of the magazine assembly.

13. The system of claim 12 wherein the push member has marker engagement tab that is configured to engage the engagement portion of the at least one marker positioned in the push position.

14. The system of claim 12 wherein the push assembly further comprises a handle member mounted on and configured to move the push member with respect to the base member.

15. The system of claim 1 additionally comprising a biasing assembly mounted on the magazine assembly and configured to bias the at least one marker in the magazine space toward the push position on the magazine assembly.

16. The system of claim 15 wherein the biasing assembly comprises: at least one slider member mounted on the magazine assembly and configured to contact any markers positioned in the magazine space, the at least one slider member being movable in the magazine space toward and away from the push position, and a biasing element configured to bias the slider member toward the push position such that the at least one slider contacts and biases any markers in the magazine space toward the push position.

17. The system of claim 1 wherein the magazine assembly defines a barrel bore and a tab slot, the tab slot being in communication with the barrel bore and the magazine space; and wherein the push assembly comprises a push member having portion positioned in the barrel bore and a marker engagement tab positioned in the tab slot and extending into the magazine space in a manner permitting the push tab to engage the engagement portion of a marker when the marker is positioned in the push position.

18. The system of claim 1 wherein the magazine assembly defines a guide channel with a shoulder configured to abut against the engagement portion of the at least one marker when the at least one marker is positioned in the magazine space, the shoulder extending laterally with respect to an axis of the movement of the portion of the push assembly.

19. The system of claim 1 wherein the push assembly does not extend out of the magazine assembly when actuated into an extended position.

20. The system of claim 1 wherein the flipper assembly is further configured hold back the remaining markers to prevent a subsequent marker from entering the push position.

21. The system of claim 1 wherein the flipper assembly comprises a pivotable flipper.

22. A method of marking a ground surface, comprising the acts of: providing a system for use with a marker and a marker insertion apparatus in marking a ground surface, comprising: the marker comprising: a shaft, the shaft having a bottom end and a top end, the shaft including: an insertion portion for insertion into the ground, the insertion portion being located at the bottom end of the shaft; a mast portion for extending above the ground surface when the insertion portion is at least partially inserted into the ground; and an engagement portion located between the insertion portion and the mast portion with the insertion portion being located between the engagement portion and the bottom end, the engagement portion being configured to be engaged and pushed by the marker insertion apparatus to cause insertion of the bottom end of the shaft into the ground; and the marker insertion apparatus comprising: a magazine assembly defining a magazine space configured receive at least one marker, the magazine space having a push position in the magazine space for receiving the at least one mark and a push assembly mounted on the magazine assembly, the push assembly comprising a flipper assembly configured to lift one marker away from the magazine assembly when the push assembly is actuated such that the push assembly engages the engagement portion of the shaft of the marker located in the push position and pushes the marker from the magazine assembly when the push assembly is actuated; selecting one or more markers from a supply of markers; inserting the one or more markers into the magazine space of the marker installation assembly; locating a buried utility pipe or line; vertically placing the marker installation apparatus over the buried utility pipe or line; applying downward pressure to the marker installation apparatus to insert a marker into the ground.

\* \* \* \* \*